US012659291B2

(12) United States Patent
Szilágyi

(10) Patent No.: US 12,659,291 B2
(45) Date of Patent: Jun. 16, 2026

(54) INTEGRATING MOBILE NETWORK CAPABILITIES WITH CLOUD PLATFORM SERVICES

(71) Applicant: Telefonaktiebolaget LM Ericsson (publ), Stockholm (SE)

(72) Inventor: László Szilágyi, San Francisco, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 313 days.

(21) Appl. No.: 18/552,785

(22) PCT Filed: Mar. 25, 2022

(86) PCT No.: PCT/IB2022/052777
§ 371 (c)(1),
(2) Date: Sep. 27, 2023

(87) PCT Pub. No.: WO2022/208265
PCT Pub. Date: Oct. 6, 2022

(65) Prior Publication Data
US 2024/0154935 A1      May 9, 2024

Related U.S. Application Data

(60) Provisional application No. 63/167,180, filed on Mar. 29, 2021, provisional application No. 63/167,183, filed on Mar. 29, 2021.

(51) Int. Cl.
*H04L 61/4511* (2022.01)
*H04L 67/53* (2022.01)
(Continued)

(52) U.S. Cl.
CPC .......... *H04L 61/4511* (2022.05); *H04L 67/53* (2022.05); *H04L 67/61* (2022.05); *H04W 8/26* (2013.01)

(58) Field of Classification Search
CPC ..... H04L 61/4511; H04L 67/53; H04L 67/61; H04L 67/51; H04W 8/26
(Continued)

(56) References Cited

U.S. PATENT DOCUMENTS 8,185,628 B2 * 5/2012 Hu .......................... H04L 12/14
709/224
10,044,816 B2 * 8/2018 Amishav ............. H04L 41/5058
(Continued)

FOREIGN PATENT DOCUMENTS

WO      WO-2016161242 A1 * 10/2016      ............ H04W 76/40
WO      WO-2017053218 A1 * 3/2017      ......... H04L 65/1016
(Continued)

*Primary Examiner* — Mahendra R Patel
(74) *Attorney, Agent, or Firm* — Nicholson, De Vos, Webster & Elliott, LLP

(57)      ABSTRACT
A method performed by a domain name system (DNS) server for a cloud infrastructure to integrate a capability provided by a mobile network with a platform service provided by the cloud infrastructure. The method includes receiving, from a user equipment (UE) connected to the mobile network, a query to resolve a fully qualified domain name (FQDN) associated with the platform service, responsive to a determination that network integration is enabled for the platform service, calling an application programming interface (API) provided by an integration logic to configure the mobile network to provide the capability for the UE when the UE accesses the platform service, and sending an internet protocol (IP) address of the platform service to the UE as a response to the query.

20 Claims, 13 Drawing Sheets

(51) Int. Cl.
    *H04L 67/61*         (2022.01)
    *H04W 8/26*         (2009.01)

(58) Field of Classification Search
    USPC ........................................................ 455/414
    See application file for complete search history.

(56) References Cited

U.S. PATENT DOCUMENTS

| | | | | |
|---|---|---|---|---|
| 10,205,701 B1 * | 2/2019 | Voss | ........................ | H04L 67/02 |
| 10,924,377 B2 * | 2/2021 | Chauhan | ................. | H04L 67/02 |
| 11,159,479 B2 * | 10/2021 | Holloway | ........... | H04L 61/4552 |
| 11,757,914 B1 * | 9/2023 | Jakobsson | ............... | H04L 51/42 |
| | | | | 726/25 |
| 2006/0013158 A1 * | 1/2006 | Ahuja | ................. | H04L 12/4641 |
| | | | | 370/328 |
| 2006/0031382 A1 * | 2/2006 | Pradhakar | ........... | G06F 16/9566 |
| | | | | 707/E17.115 |
| 2008/0273682 A1 * | 11/2008 | Bakker | ............. | H04M 3/42314 |
| | | | | 379/201.12 |
| 2009/0227228 A1 | 9/2009 | Hu et al. | | |
| 2015/0172394 A1 * | 6/2015 | Lapenna | ............... | H04W 4/023 |
| | | | | 455/456.3 |
| 2015/0195138 A1 * | 7/2015 | Horman | ............. | H04L 61/4511 |
| | | | | 709/226 |
| 2016/0100362 A1 * | 4/2016 | Palanisamy | ......... | H04W 68/005 |
| | | | | 370/311 |
| 2016/0255050 A1 * | 9/2016 | Grayson | ............. | H04L 63/1433 |
| | | | | 726/1 |
| 2017/0126618 A1 * | 5/2017 | Bhaskaran | .......... | H04L 61/5014 |
| 2018/0331950 A1 * | 11/2018 | Bogner | ................. | H04L 45/64 |
| 2021/0250349 A1 * | 8/2021 | Konda | ............... | H04L 63/0823 |
| 2021/0385100 A1 * | 12/2021 | Karmarkar | ......... | H04L 12/1845 |
| 2022/0278955 A1 * | 9/2022 | Roy | ................... | H04L 67/1021 |
| 2024/0056509 A1 * | 2/2024 | Bulakci | .................. | H04L 67/51 |

FOREIGN PATENT DOCUMENTS

| | | | | | |
|---|---|---|---|---|---|
| WO | WO-2017100640 A1 * | 6/2017 | ............ | H04W 76/10 |
| WO | WO-2018175378 A1 * | 9/2018 | ............ | H04W 12/08 |
| WO | WO-2019102077 A1 * | 5/2019 | ........ | H04L 63/0421 |
| WO | WO-2020160178 A1 * | 8/2020 | ......... | H04W 36/322 |
| WO | WO-2021126948 A1 * | 6/2021 | ......... | H04W 36/322 |
| WO | WO-2021194471 A1 * | 9/2021 | ............ | H04L 69/40 |
| WO | WO-2021198083 A1 * | 10/2021 | ............ | H04L 67/51 |

* cited by examiner

Figure 8

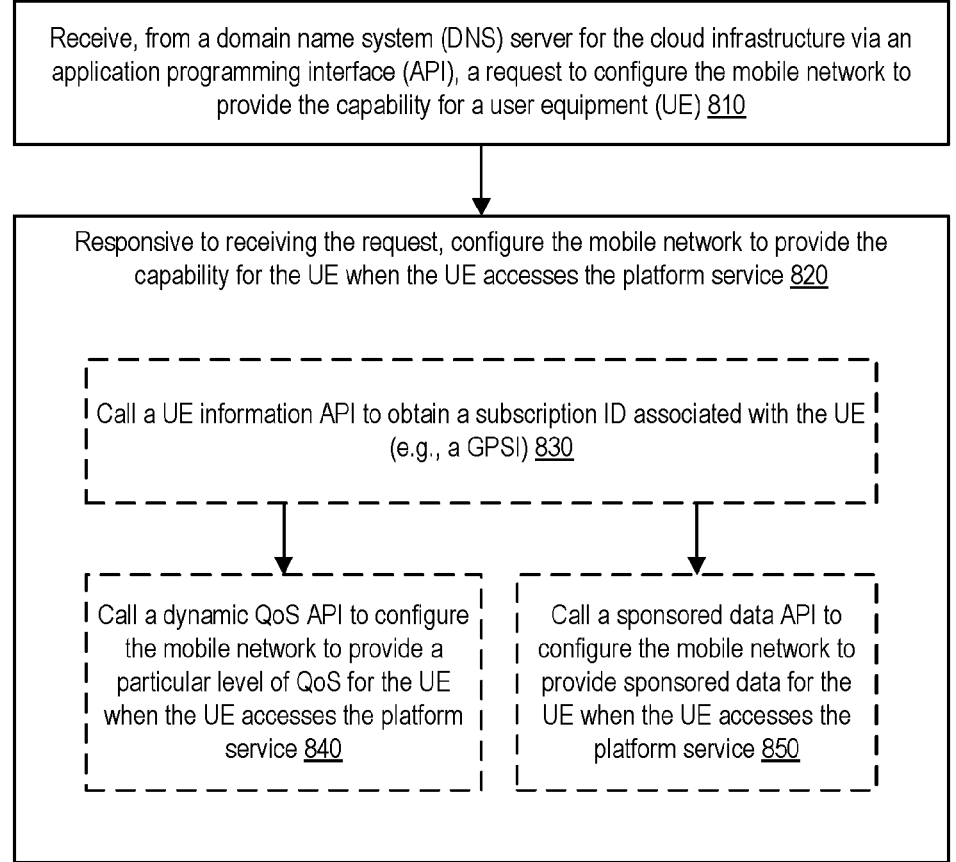

Receive, from a domain name system (DNS) server for the cloud infrastructure via an application programming interface (API), a request to configure the mobile network to provide the capability for a user equipment (UE) 810

Responsive to receiving the request, configure the mobile network to provide the capability for the UE when the UE accesses the platform service 820

Call a UE information API to obtain a subscription ID associated with the UE (e.g., a GPSI) 830

Call a dynamic QoS API to configure the mobile network to provide a particular level of QoS for the UE when the UE accesses the platform service 840

Call a sponsored data API to configure the mobile network to provide sponsored data for the UE when the UE accesses the platform service 850

Figure 9

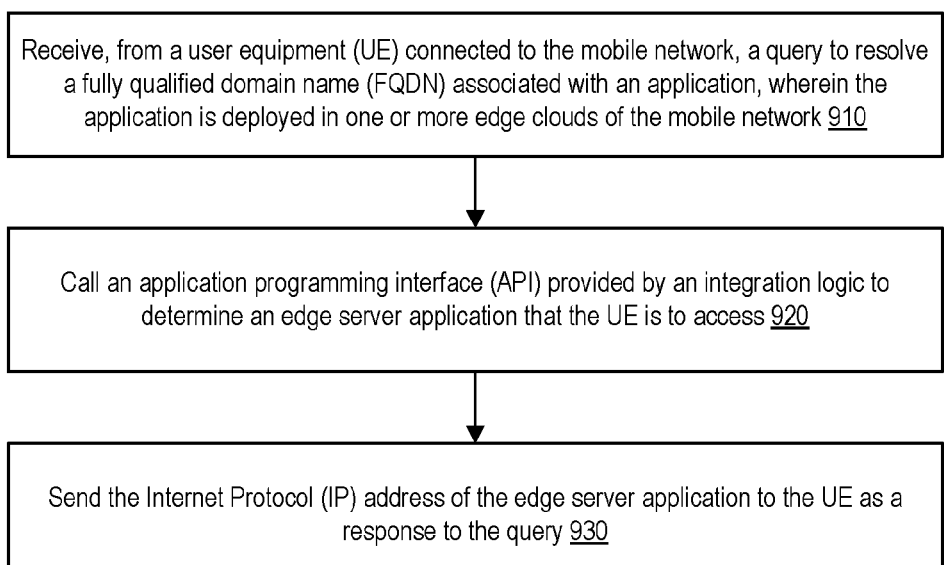

Receive, from a user equipment (UE) connected to the mobile network, a query to resolve a fully qualified domain name (FQDN) associated with an application, wherein the application is deployed in one or more edge clouds of the mobile network 910

Call an application programming interface (API) provided by an integration logic to determine an edge server application that the UE is to access 920

Send the Internet Protocol (IP) address of the edge server application to the UE as a response to the query 930

Figure 10

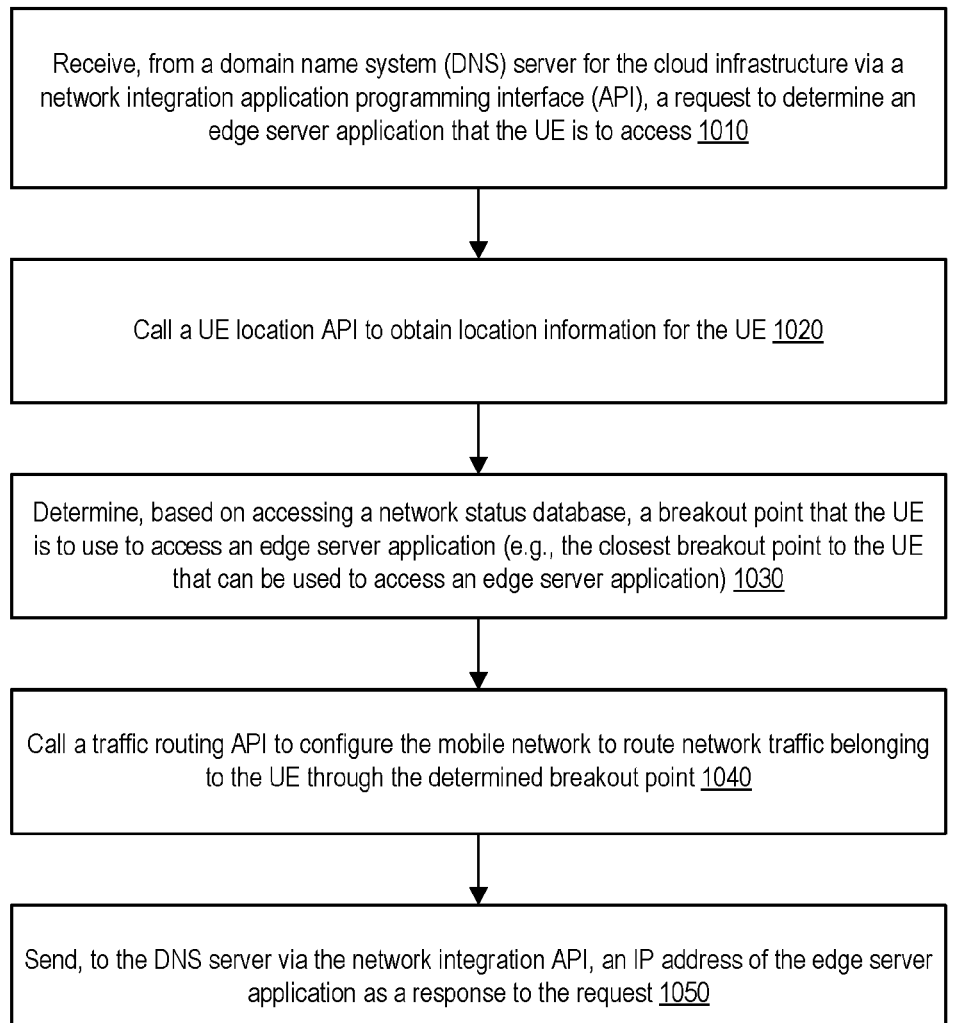

Receive, from a domain name system (DNS) server for the cloud infrastructure via a network integration application programming interface (API), a request to determine an edge server application that the UE is to access 1010

Call a UE location API to obtain location information for the UE 1020

Determine, based on accessing a network status database, a breakout point that the UE is to use to access an edge server application (e.g., the closest breakout point to the UE that can be used to access an edge server application) 1030

Call a traffic routing API to configure the mobile network to route network traffic belonging to the UE through the determined breakout point 1040

Send, to the DNS server via the network integration API, an IP address of the edge server application as a response to the request 1050

COMMUNICATION SYSTEM
1100

HOST
1116

TELECOMMUNICATION NETWORK
1102

CORE NETWORK
1106

CORE NETWORK
NODE
1108

ACCESS NETWORK
1104

NETWORK NODE
1110A

NETWORK NODE
1110B

UE
1112A

UE
1112B

HUB
1114

UE
1112C

UE
1112D

INTEGRATING MOBILE NETWORK CAPABILITIES WITH CLOUD PLATFORM SERVICES

CROSS-REFERENCE TO RELATED APPLICATIONS

This application is a National stage of International Application No. PCT/IB2022/052777, filed Mar. 25, 2022, which claims the benefit of U.S. Provisional Application No. 63/167,180 filed Mar. 29, 2021, titled "HCP PLATFORM SERVICES WITH DYNAMIC QOS", and U.S. Provisional Application No. 63/167,183 filed Mar. 29, 2021, titled, "HCP PLATFORM SERVICES WITH SPONSORED DATA", which are hereby incorporated by reference.

TECHNICAL FIELD

Embodiments of the invention relate to the field of mobile networks and cloud computing, and more specifically to integrating mobile network capabilities with a cloud platform service.

BACKGROUND

Cloud computing refers to the on-demand delivery of computing resources, typically over a network (e.g., the Internet) with pay-as-you-go pricing. For example, instead of buying, owning, and maintaining physical data centers and servers, a user may access computing resources such as computing power, storage, and databases, on an as-needed basis from a cloud provider.

A communication service provider (CSP) may offer telecommunications services or some combination of information and media services, content, entertainment and application services over networks, leveraging the network infrastructure as a rich, functional platform. A CSP may own and/or operate a mobile network such as a Fourth Generation (4G) Long-term Evolution (LTE) mobile network and/or a Fifth Generation (5G) mobile network.

A hyperscale cloud platform (HCP) is a multi-tenant platform where computing, network, and storage resources can be accessed by multiple tenants on demand. HCP developer ecosystems are potent channels for communication service providers (CSPs) to monetize their mobile networks (e.g., 5G mobile network) assets. For example, CSPs may deploy HCP edge infrastructures inside their mobile network premises to provide mobile edge computing services (an example of this is Amazon Web Services (AWS) Wavelength).

Mobile networks may provide various capabilities such as dynamic quality of service (QoS) and sponsored data. Dynamic QoS refers to the ability of the mobile network to adjust the level of QoS provided for specified network traffic on demand and/or responsive to the occurrence of certain events. Sponsored data refers to the ability of the mobile network to charge a subscriber's data usage fees to a sponsor (instead of to the subscriber). The sponsor may be a CSP, a content provider, or other company/organization.

A CSP may monetize the capabilities of its mobile network by exposing application programming interfaces (APIs) in their native forms to a CSP portal and/or a HCP/third-party provider (3PP) marketplace. Application developers may use these APIs to leverage the capabilities provided by the mobile network (e.g., dynamic QoS or sponsored data APIs). However, leveraging such capabilities requires significant development effort and attention from application developers.

SUMMARY

An embodiment is a method performed by a domain name system (DNS) server for a cloud infrastructure to integrate a capability provided by a mobile network with a platform service provided by the cloud infrastructure. The method includes receiving, from a user equipment (UE) connected to the mobile network, a query to resolve a fully qualified domain name (FQDN) associated with the platform service, responsive to a determination that network integration is enabled for the platform service, calling an application programming interface (API) provided by an integration logic to configure the mobile network to provide the capability for the UE when the UE accesses the platform service, and sending an internet protocol (IP) address of the platform service to the UE as a response to the query.

An embodiment is a set of non-transitory machine-readable media having computer code stored therein, which when executed by a set of one or more processors of one or more network devices implementing a DNS server for a cloud infrastructure, causes the DNS server to perform operations for integrating a capability provided by a mobile network with a platform service provided by the cloud infrastructure. The operations include receiving, from a user equipment (UE) connected to the mobile network, a query to resolve a fully qualified domain name (FQDN) associated with the platform service, responsive to a determination that network integration is enabled for the platform service, calling an application programming interface (API) provided by an integration logic to configure the mobile network to provide the capability for the UE when the UE accesses the platform service, and sending an internet protocol (IP) address of the platform service to the UE as a response to the query.

An embodiment is a method performed by an integration logic to integrate a capability provided by a mobile network with a platform service provided by a cloud infrastructure. The method includes receiving, from a domain name system (DNS) server for the cloud infrastructure via an application programming interface (API), a request to configure the mobile network to provide the capability for a user equipment (UE) and responsive to receiving the request, configuring the mobile network to provide the capability for the UE when the UE accesses the platform service.

An embodiment is a set of non-transitory machine-readable media having computer code stored therein, which when executed by a set of one or more processors of one or more network devices implementing an integration logic, causes the integration logic to perform operations for integrating a capability provided by a mobile network with a platform service provided by the cloud infrastructure. The operations include receiving, from a domain name system (DNS) server for the cloud infrastructure via an application programming interface (API), a request to configure the mobile network to provide the capability for a user equipment (UE) and responsive to receiving the request, configuring the mobile network to provide the capability for the UE when the UE accesses the platform service.

BRIEF DESCRIPTION OF THE DRAWINGS

The invention may best be understood by referring to the following description and accompanying drawings that are used to illustrate embodiments of the invention. In the drawings:

FIG. 8 is a flow diagram showing a method performed by an integration logic to integrate a capability provided by a mobile network with a platform service provided by a cloud infrastructure, according to some embodiments.

FIG. 9 is a flow diagram showing a method performed by a DNS server for providing location aware breakout point selection and routing, according to some embodiments.

FIG. 10 is a flow diagram showing a method performed by an integration logic for providing location aware breakout point selection and routing, according to some embodiments.

DETAILED DESCRIPTION

Figure 1:
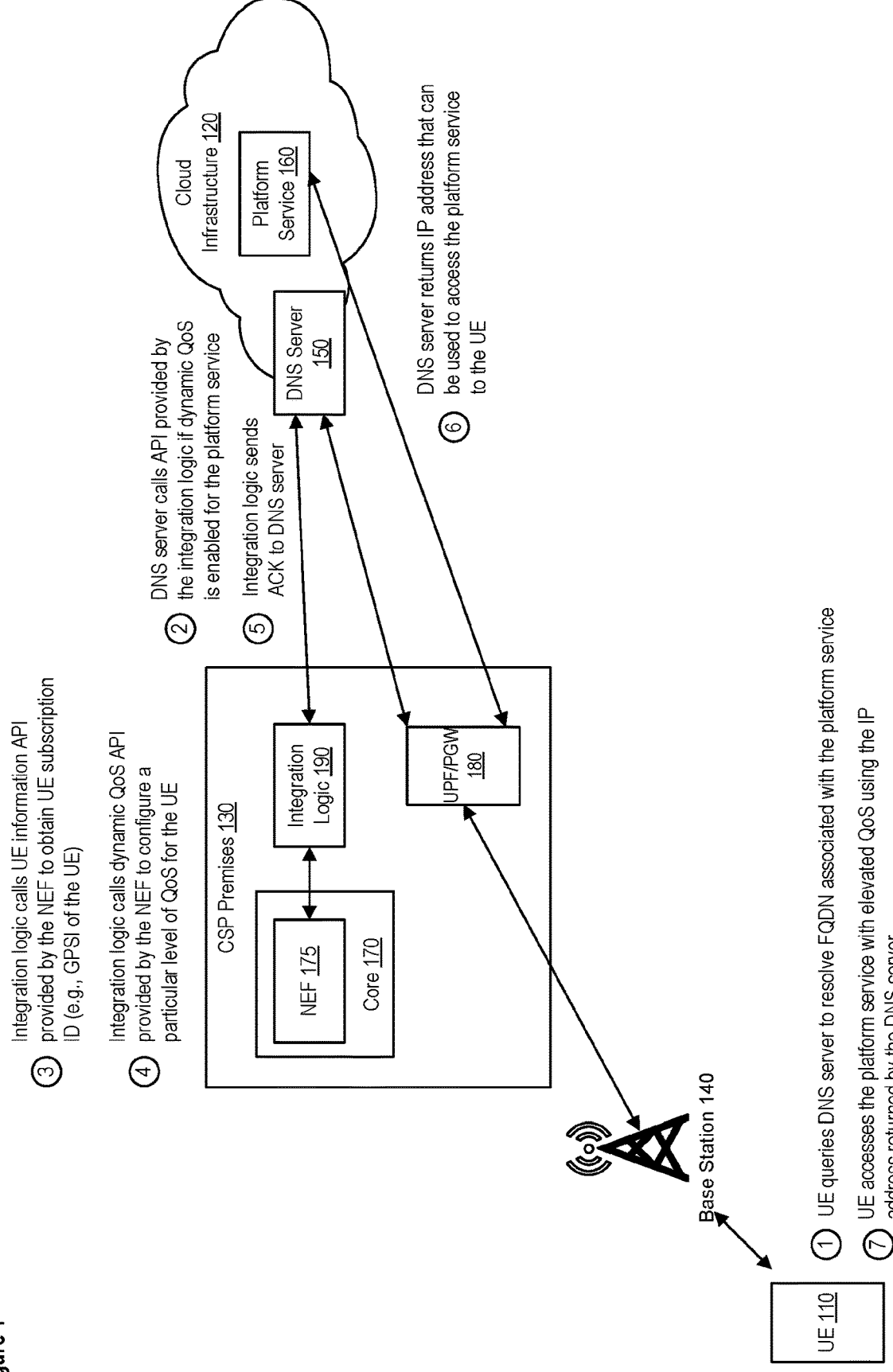
FIG. 1 is a diagram showing an environment in which a capability provided by a mobile network can be integrated with a platform service provided by a cloud infrastructure and example operations for integrating a dynamic QoS service capability provided by the mobile network with the platform service, according to some embodiments.

The following description describes methods and apparatus for integrating capabilities provided by a mobile network with a platform service provided by a cloud infrastructure. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As mentioned above, application developers may use native application programming interfaces (APIs) exposed by communication service providers (CSPs) to leverage the capabilities provided by mobile networks. However, leveraging such capabilities requires significant development effort and attention from the application developer.

Embodiments disclosed herein provide a way to integrate one or more capabilities provided by a mobile network (e.g., dynamic QoS and/or sponsored data) with a platform service provided by a cloud infrastructure (e.g., a hyperscale cloud provider (HCP) platform service). Embodiments allow application developers to leverage the capabilities provided by a mobile network with less development effort and provides additional channels for the CSP to monetize the capabilities provided by its mobile network.

Using embodiments disclosed herein, capabilities provided by a mobile network such as dynamic quality of service (QoS) and/or sponsored data can be integrated with a platform service provided by a cloud infrastructure such as Amazon® Kinesis Video Streams, which is a video stream processing service on Amazon Web Services (AWS) that is used for video analytics (e.g., for security cameras). For example, using embodiments disclosed herein, an application developer may select dynamic QoS and/or sponsored data capabilities as an option (e.g., as part of selecting the Kinesis service tier), and any mobile client connecting to its Kinesis instance over the mobile network would implicitly leverage the dynamic QoS and/or sponsored data capabilities provided by the mobile network. Embodiments achieve this by configuring the domain name system (DNS) server for the cloud infrastructure to trigger the dynamic QoS API and/or the sponsored data API exposed by the mobile network when a mobile client attempts to access the platform service using the fully-qualified domain name (FQDN) associated with the Kinesis instance.

An embodiment is a method performed by a DNS server for the cloud infrastructure to integrate a capability provided by a mobile network with a platform service provided by the cloud infrastructure. The method includes receiving, from a user equipment (UE) connected to the mobile network, a query to resolve a FQDN associated with the platform service, responsive to a determination that network integration is enabled for the platform service, calling an API provided by an integration logic to configure the mobile network to provide the capability for the UE when the UE accesses the platform service, and sending an internet protocol (IP) address of the platform service to the UE as a response to the query.

An embodiment is a method performed by an integration logic to integrate a capability provided by a mobile network with a platform service provided by a cloud infrastructure. The method includes receiving, from a DNS server for the cloud infrastructure via an API, a request to configure the mobile network to provide the capability for a UE and responsive to receiving the request, configuring the mobile network to provide the capability for the UE when the UE accesses the platform service.

Embodiments provide one or more advantages over existing solutions. An advantage of embodiments disclosed herein is that they provide simplicity for the application developer. The application developer does not have to explicitly use the native APIs exposed by the mobile network to leverage the capabilities provided by the mobile network, but instead may simply select a service tier or configure a high-level platform service parameter. DNS and FQDNs can be used as usual and no/minimal changes are needed to existing HCP best practices. Another advantage of embodiments disclosed herein is that they provide additional monetization options for the CSP besides the traditional CSP and HCP API marketplace channels. Embodiments allow CSPs to do this while hiding complexities and sensitive information (e.g., a CSP can decide not to openly share its dynamic QoS and/or sponsored data APIs with the application developer). Various embodiments are now described with reference to the accompanying figures.

FIG. 1 is a diagram showing an environment in which a capability provided by a mobile network can be integrated with a platform service provided by a cloud infrastructure and example operations for integrating a dynamic QoS service capability provided by the mobile network with the platform service, according to some embodiments.

As shown in the diagram, the environment includes a UE 110, a base station 140, a CSP premises 130, and a cloud infrastructure 120. The cloud infrastructure 120 may include a collection of hardware and software resources that enable cloud computing. For example, the cloud infrastructure 120 may include computing resources, networking resources, and/or storage resources, as well as an interface for cloud users to access virtualized resources. In an embodiment, the cloud infrastructure 120 provides a hyperscale cloud platform (HCP) (e.g., an edge cloud and/or a non-edge cloud). In an embodiment, the cloud infrastructure 120 is part of a colocation data center. As shown in the diagram, the cloud infrastructure 120 may provide a platform service 160 and a DNS server 150. In an embodiment, the platform service 160 is a video processing service (e.g., Amazon Kinesis) but it should be understood that embodiments are not limited thereto.

The UE 110 may be a network device that can communicate wirelessly with a mobile network such as a Fourth Generation (4G) Long-term Evolution (LTE) mobile network and/or a Fifth Generation (5G) mobile network. The UE 110 may be, for example, a mobile phone, a laptop, or similar device. The UE 110 may implement a client application that can access the platform service 160 provided by the cloud infrastructure 120 over a mobile network.

The mobile network may be owned/operated by a CSP and may include the base station 140, a user plane function (UPF) or PDN gateway (PGW) 180, and a core 170 (e.g., a 5G Core (5GC)) that includes a network exposure function (NEF) 175. The core 170 (including the NEF 175), the UPF/PGW 180, and the integration logic 190 may be deployed in CSP premises 130 (e.g., a central point of presence (PoP) of the CSP), although other configurations are possible (e.g., in an embodiment, the integration logic 190 is deployed outside of CSP premises 130). The base station 140 may communicate wirelessly with UEs to provide the UEs with access to the rest of the mobile network. In an embodiment, the base station 140 is an eNodeB or a gNodeB. The UPF/PGW 180 is a function that provides connectivity between the base stations and a date network. The NEF 175 may expose one or more APIs to the integration logic 190 that can be used to access the capabilities provided by the mobile network. For example, the NEF 175 may expose a "UE information" API that can be used to obtain location information for a UE 110, a "dynamic QoS" API that can be used to configure the mobile network to provide a particular level of QoS for certain network traffic, and/or a "sponsored data" API that can be used to configure the mobile network to provide sponsored data for certain network traffic (where data usage fees are charged to a designated sponsor). As will be described in additional detail below, in an embodiment, the integration logic 190 exposes an API to the DNS server 150 that the DNS server 150 can use to activate certain capabilities provided by the mobile network for a UE 110 accessing the platform service 160 over the mobile network (such API may be referred to herein as a "network integration" API).

The configuration of components shown in the diagram are provided as an example to illustrate a particular embodiment. It should be understood that other embodiments may use a different configuration. While terminology of 3rd Generation Partnership Project (3GPP) standards are used herein to help describe embodiments (e.g., UPF/PGW and NEF), it should be understood that some embodiments may be implemented using networks and/or components that do not comply with the 3GPP standard.

In an embodiment, when the DNS server 150 for the cloud infrastructure 120 receives a query from the UE 110 to resolve a fully-qualified domain name (FQDN) associated with the platform service 160, the DNS server 150 determines whether network integration is enabled for the platform service 160. In an embodiment, the DNS server 150 determines whether network integration is enabled for the platform service 160 based on accessing a DNS record for the FQDN associated with the platform service (e.g., the DNS record for the FQDN may include an indication of whether network integration is enabled or not). If the DNS server 150 determines that network integration is enabled for the platform service 160, then then the DNS server 150 may call the network integration API provided by the integration logic 190 to activate certain capabilities provided by the mobile network (e.g., dynamic QoS and/or sponsored data) for the UE 110. In an embodiment, the DNS server 150 provides the Internet Protocol (IP) address of the UE 110 in this API call. The DNS server 150 may obtain the IP address of the UE 110 based on the query it received from the UE 110. In response to receiving the API call, the integration logic 190 may call one or more APIs provided by the NEF

175 to activate certain capabilities provided by the mobile network for the UE 110. For example, the integration logic 190 may call a UE information API provided by the NEF 175 to obtain a subscription ID associated with the UE 110 (e.g., a Generic Public Subscription Identifier (GPSI)). In an embodiment, the integration logic 190 provides the IP address of the UE 110 in this API call. In response to receiving the API call, the NEF 175 may determine the subscription ID associated with the UE 110 (e.g., based on the IP address of the UE 110 that was provided in the API call) and provide it to the integration logic 190. The integration logic 190 may then call an API provided by the NEF 175 to activate one or more capabilities provided by the mobile network (e.g., dynamic QoS and/or sponsored data) for the UE 110. The integration logic 190 may provide the subscriber ID associated with the UE 110 (which the integration logic 190 obtained by calling the UE information API), the IP address and port number of the UE 110, the IP address and port number of the platform service 160, and/or the protocol type in this API call (e.g., to help identify the network traffic to which the capabilities should be applied). The integration logic 190 may obtain the IP address of the UE 110 from the DNS server 150. The integration logic 190 may have previous knowledge of the port number of the UE 110, the IP address and port number of the platform service 160, and the protocol type (e.g., based on user configuration), or obtain such information using known means. In response to receiving the API call, the NEF 175 may configure the mobile network to provide the capabilities for the UE 110 when the UE 110 accesses the platform service 160 (e.g., by configuring the mobile network to apply the capabilities to network traffic between the UE 110 and the platform service 160 (this network traffic may be identified based on a 5-tuple of UE IP address, UE port number, platform service IP address, platform service port number, and protocol type)). The NEF 175 may use the subscriber ID associated with the UE 110 to determine whether the subscribe is eligible to receive certain services (e.g., dynamic QoS and/or sponsored data) and/or to help with identifying the network traffic belonging to the UE 110. If the configuration is successful, the integration logic 190 may send an acknowledgement message to the DNS server 150. The DNS server 150 may then send an IP address to the UE 110 that can be used to access the platform service 160 (as a response to the UE's original query). The UE 110 may then use the IP address to access the platform service 160 over the mobile network with certain capabilities activated for the UE 110 in the mobile network.

Example operations for integrating a dynamic QoS capability provided by the mobile network with the platform service 160 are now described to illustrate a particular embodiment. At operation 1, the UE 110 queries the DNS server 150 to resolve a FQDN associated with the platform service 160. At operation 2, the DNS server 150 calls a network integration API provided by the integration logic 190 (e.g., providing the IP address of the UE 110 in the API call) if dynamic QoS is enabled for the platform service 160. At operation 3, the integration logic 190 calls the UE information API provided by the NEF 175 (e.g., providing the IP address of the UE 110 in the API call) to obtain a subscription ID (e.g., a GPSI) associated with the UE 110 (e.g., the NEF 175 may determine a GPSI associated with the UE 110 based on the IP address of the UE 110). At operation 4, the integration logic 190 calls the dynamic QoS API provided by the NEF 175 (e.g., providing the GPSI associated with the UE 110, the IP address and port number of the UE 110, the IP address and port number of the platform service 160, the protocol type, and the desired level of QoS in the API call) to activate dynamic QoS for the UE 110 in the mobile network. Responsive to receiving the API call, the NEF 175 configures the mobile network to provide a particular level of QoS (e.g., the desired level of QoS provided in the API call) for the UE 110 when the UE 110 accesses the platform service 160. The NEF 175 may identify this network traffic based on the 5-tuple of UE IP address, UE port number, platform service IP address, platform service port number, and protocol type. At operation 5, if the configuration is successful, the integration logic 190 sends an acknowledgement ("ACK") message to the DNS server 150. At operation 6, the DNS server 150 returns an IP address to the UE 110 that the UE 110 can use to access the platform service 160. At operation 7, the UE 110 accesses the platform service 160 with elevated QoS using the IP address returned by the DNS server 150.

Figure 2:
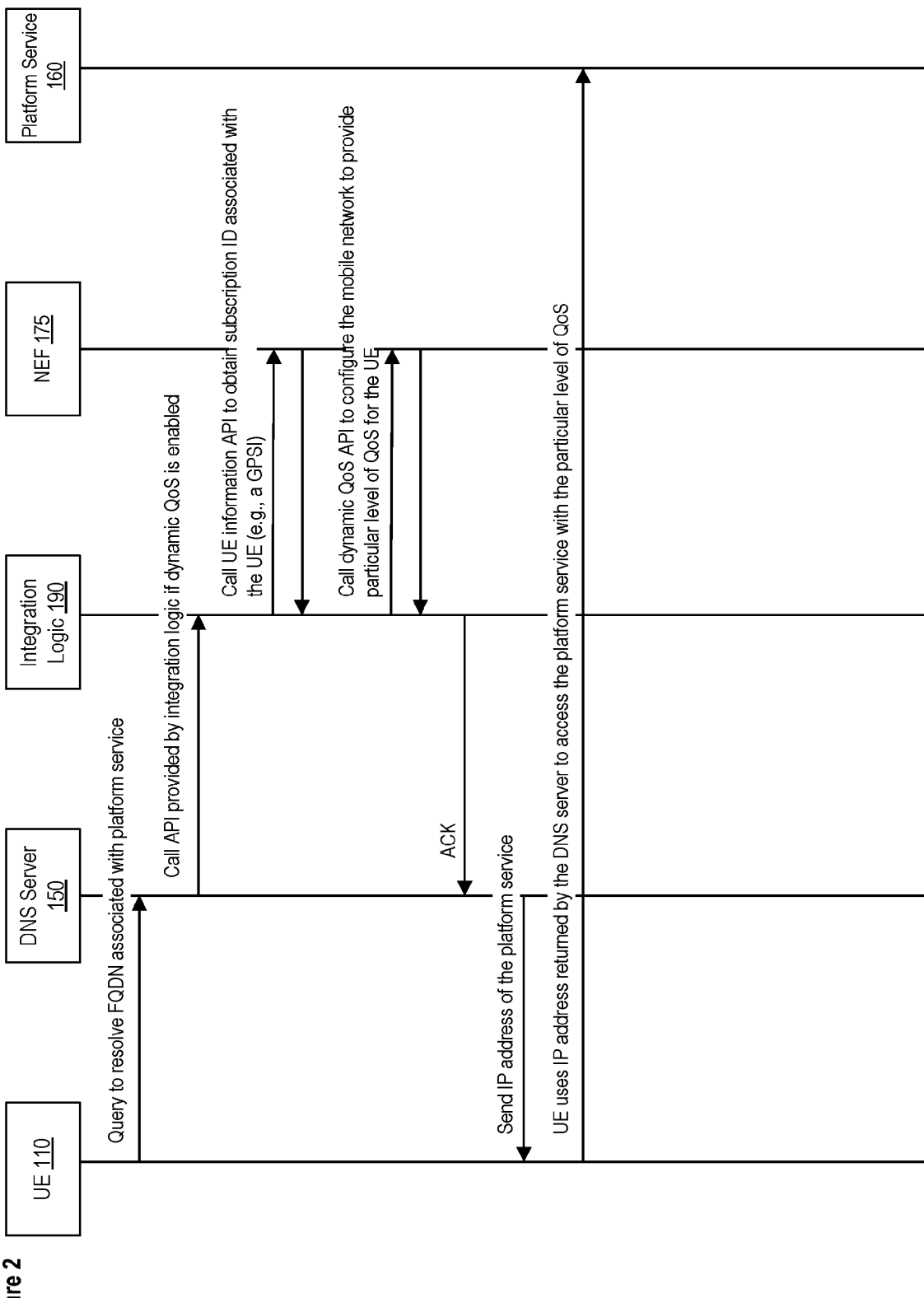
FIG. 2 is a diagram showing component interactions for integrating a dynamic QoS capability provided by the mobile network with a platform service, according to some embodiments.

FIG. 2 is a diagram showing component interactions for integrating a dynamic QoS capability provided by the mobile network with a platform service, according to some embodiments. As shown in the diagram, the UE 110 sends a query to resolve a FQDN associated with the platform service 160 to the DNS server 150. Responsive to receiving the query, the DNS server 150 calls the network integration API provided by the integration logic 190 if dynamic QoS is enabled for the platform service. The integration logic 190 calls the UE information API provided by the NEF 175 to obtain a subscription ID associated with the UE 110 (e.g., a GPSI). The integration logic 190 then calls the dynamic QoS API provided by the NEF 175 to configure the mobile network to provide a particular level of QoS for the UE 110 when the UE 110 accesses the platform service 160. The integration logic 190 then sends an acknowledgement to the DNS server 150. The DNS server 150 then sends an IP address that can be used to access the platform service 160 to the UE 110. The UE 110 then uses the IP address returned by the DNS server 150 to access the platform service 160 with the particular level of QoS (e.g., the mobile network provides the particular level of QoS for network traffic sent between the UE 110 and the platform service 160).

Figure 3:
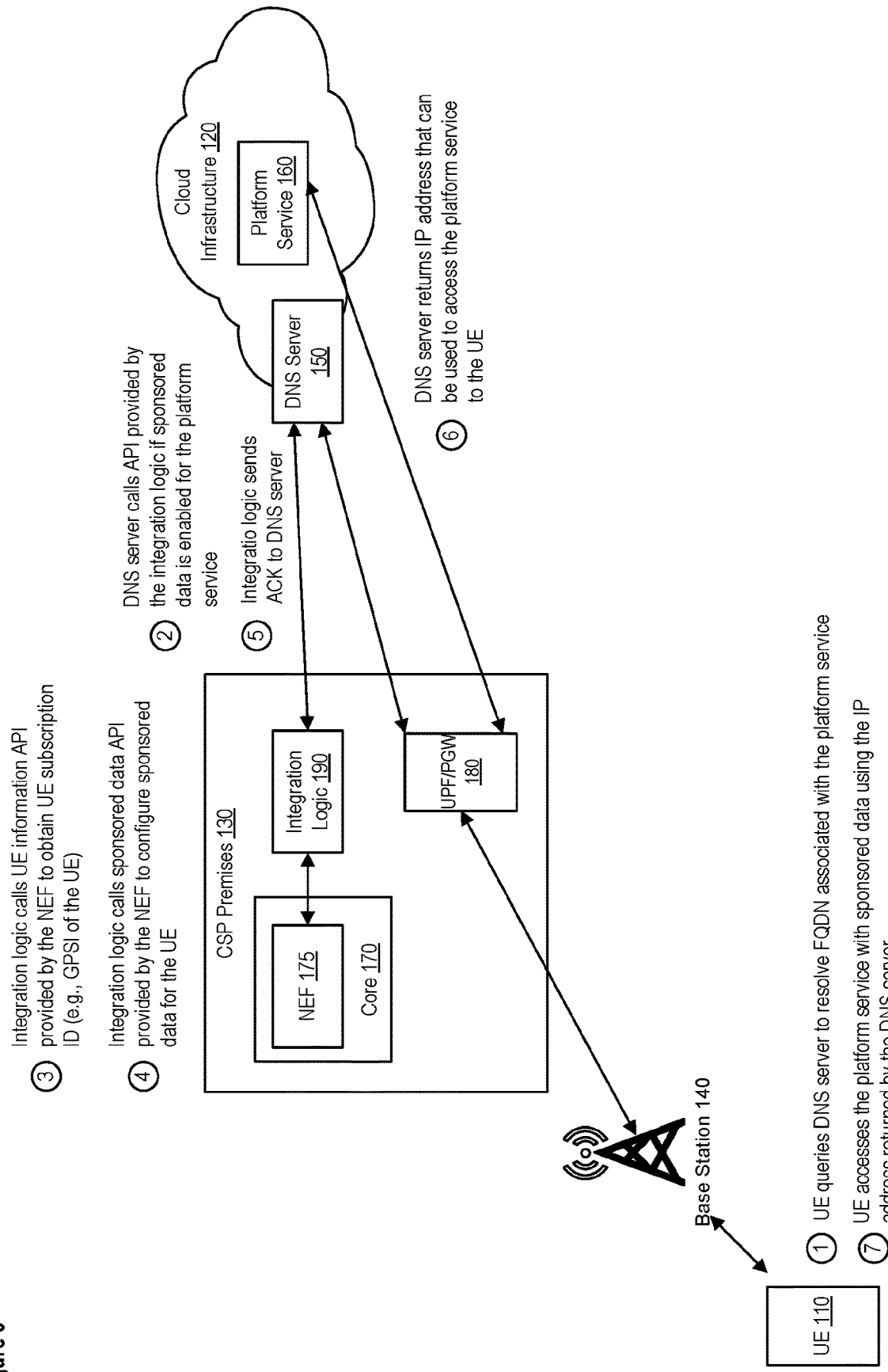
FIG. 3 is a diagram showing an environment and example operations for integrating a sponsored data capability provided by the mobile network with the platform service, according to some embodiments.

FIG. 3 is a diagram showing an environment and example operations for integrating a sponsored data capability provided by the mobile network with the platform service, according to some embodiments. The environment shown in FIG. 3 is similar to the environment shown in FIG. 1, and therefore a description of the components of the environment is not repeated in detail here for the sake of brevity. Example operations for integrating a sponsored data capability provided by the mobile network with the platform service 160 are now described to illustrate a particular embodiment. At operation 1, the UE 110 queries the DNS server 150 to resolve a FQDN associated with the platform service 160. At operation 2, the DNS server 150 calls a network integration API provided by the integration logic 190 (e.g., providing the IP address of the UE 110 in the API call) if sponsored data is enabled for the platform service 160. At operation 3, the integration logic 190 calls the UE information API provided by the NEF 175 (e.g., providing the IP address of the UE 110 in the API call) to obtain a subscription ID (e.g., a GPSI) associated with the UE 110 (e.g., the NEF 175 may determine a GPSI associated with the UE 110 based on the IP address of the UE 110). At operation 4, the integration logic 190 calls the sponsored data API provided by the NEF 175 (e.g., providing the GPSI associated with the UE 110, the IP address and port number of the UE 110, the IP address and port number of the platform service 160, and the protocol type in the API call)

to activate sponsored data for the UE 110 in the mobile network. Responsive to receiving the API call, the NEF 175 configures the mobile network to provide sponsored data for the UE 110 when the UE 110 accesses the platform service 160. The NEF 175 may identify this network traffic based on the 5-tuple of UE IP address, UE port number, platform service IP address, platform service port number, and protocol type At operation 5, if the configuration is successful, the integration logic 190 sends an acknowledgement ("ACK") message to the DNS server 150. At operation 6, the DNS server 150 returns an IP address to the UE 110 that the UE 110 can use to access the platform service 160. At operation 7, the UE 110 accesses the platform service 160 with sponsored data using the IP address returned by the DNS server 150.

Figure 4:
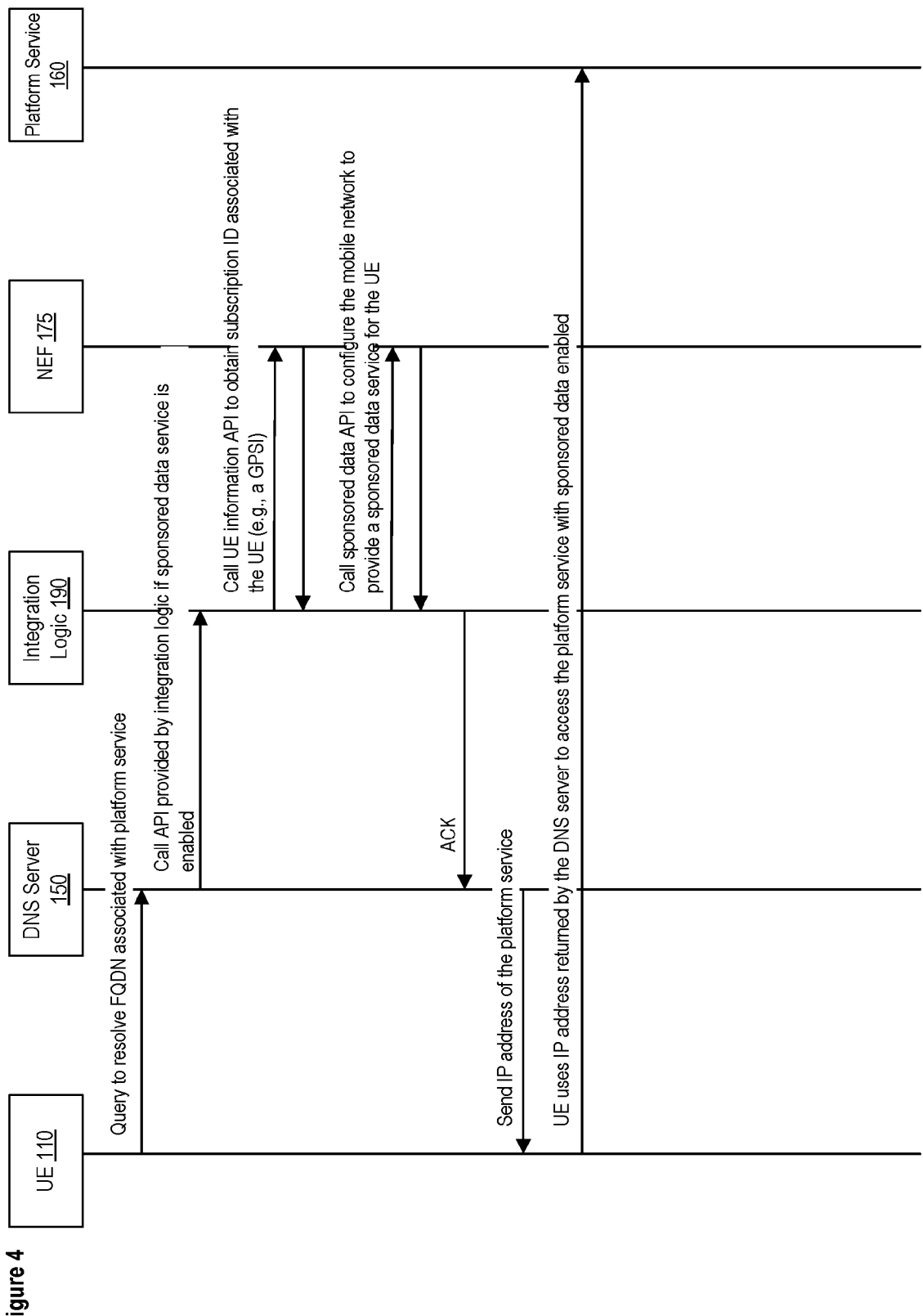
FIG. 4 is a diagram showing component interactions for integrating a sponsored data capability provided by the mobile network with a platform service, according to some embodiments.

FIG. 4 is a diagram showing component interactions for integrating a sponsored data capability provided by the mobile network with a platform service, according to some embodiments. As shown in the diagram, the UE 110 sends a query to resolve a FQDN associated with the platform service to the DNS server 150. Responsive to receiving the query, the DNS server 150 calls the network integration API provided by the integration logic 190 if sponsored data is enabled for the platform service. The integration logic 190 calls the UE information API provided by the NEF 175 to obtain a subscription ID associated with the UE 110 (e.g., a GPSI). The integration logic 190 then calls the sponsored data API to configure the mobile network to provide sponsored data for the UE 110. The integration logic 190 then sends an acknowledgement to the DNS server 150. The DNS server 150 then sends an IP address that can be used to access the platform service 160 to the UE 110. The UE 110 then uses the IP address returned by the DNS server 150 to access the platform service 160 with sponsored data (e.g., the mobile network charges data usage fees related to the UE 110 accessing the platform service 160 to a designated sponsor).

While examples are described above for integrating dynamic QoS and sponsored data capabilities with a platform service 160, it should be understood that the same/similar technique may be used to integrate other types of capabilities provided by the mobile network with the platform service 160.

Some CSPs are planning to integrate with HCPs to secure the monetization of the capabilities of their mobile networks (e.g., 5G capabilities). Having HCP edge infrastructures inside CSP premises enables application developers to provision workloads on the edge of the mobile network, thereby reducing latency between mobile clients and server applications.

Application developers may use the HCP's developer experience and best practices to expand their virtual private clouds with edge locations to create a seamless cloud-edge continuum, while leveraging the capabilities of the CSP's mobile network. Currently, this is achieved with active interaction between the CSP and HCP infrastructures (e.g., the HCP has to be able to allocate IP addresses from the CSP's mobile network).

Current edge implementations have limited number of edge locations. Application developers are usually faced with a simple choice of deploying their application in an edge cloud location or a central cloud location in a specific region. These implementations work without sophisticated routing (e.g., the edge nodes are placed next to the UE's default PGW/UPFs).

Location-aware UPF (and data network) selection can be implemented by leveraging a "UE location" API and an "application function (AF) influence on traffic routing" API. However, the use of these APIs requires that application developers have a complete understanding of the edge locations (and network topology) and complicates application development, especially as the number of edge locations continue to grow. CSPs might be hesitant to share details of their mobile network infrastructure with application developers and/or to give application developers direct control over routing decisions.

Embodiments disclosed herein provide location-aware breakout point selection and routing that is triggered by a DNS server for a cloud infrastructure. In an embodiment, when a DNS server for a cloud infrastructure receives a query from a UE to resolve a FQDN associated with an application deployed in one or more edge clouds, the DNS server calls an API provided by an integration logic, providing a list of edge server application IP addresses in the API call. Responsive to receiving this API call, the integration logic 190 calls a UE location API to obtain UE location information and determines, based on the UE location information, the list of edge server application IP addresses, and accessing a network status database, the "closest" breakout point (e.g., in terms of geographical distance and/or latency) to the UE that the UE can use to access an edge server application. The integration logic may then call a traffic routing API to configure the mobile network to route network traffic belonging to the UE through the closest breakout point. The integration logic may then send the IP address of the edge server application to the DNS server. The DNS server may then return the IP address of the edger server application to the UE as a response to the UE's original query. The UE may use this IP address to access the edge server application through the closest breakout point.

Embodiments provide one or more advantages over existing solutions. An advantage of embodiments disclosed herein is that they provide simplicity for the application developer. The application developer does not have to be aware of all of the edge locations. DNS and FQDNs can be used to reach edge server applications, as usual. Also, application developers can rely on existing HCP best practices. For example, an application developer can design its virtual private cloud (VPC) and deploy workloads into them as usual. Another advantage of embodiments disclosed herein is that they allow CSPs to hide complexities and sensitive information. For example, CSPs do not have to openly share edge locations with application developers, do not have to expose routing APIs directly to application developers, and can optimize resource utilization by implementing load balancing mechanisms under the hood. Another advantage of embodiments disclosed herein is that they allow cloud providers to hide complexities and sensitive information. For example, cloud providers can leverage existing developer ecosystem competence with a seamless developer experience, and can perform optimization and load balancing as usual with DNS policies. Various embodiments are now described with reference to the accompanying figures.

Figure 5:
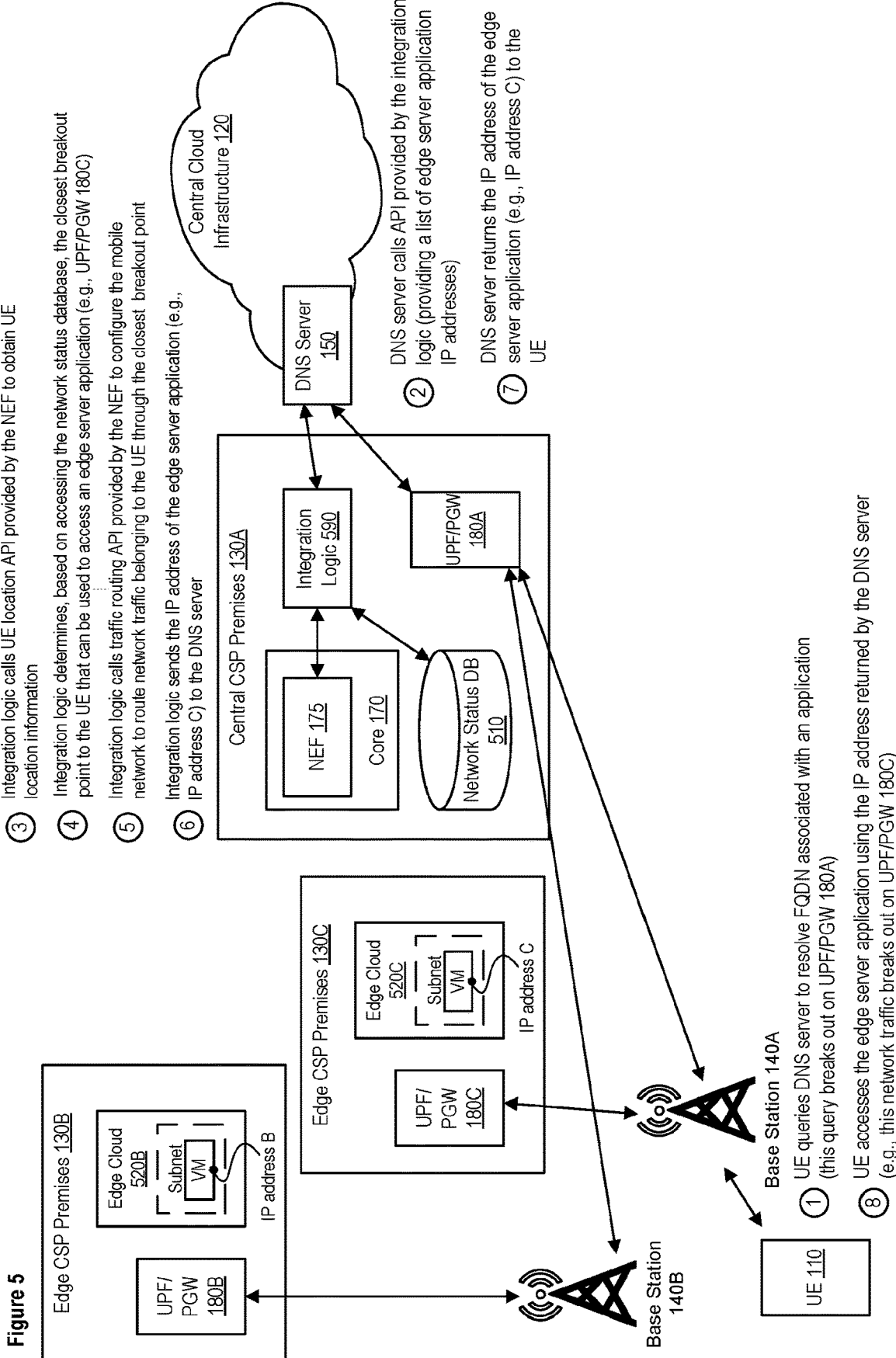
FIG. 5 is a diagram showing an environment in which location-aware breakout point selection and routing can be implemented, and example operations for providing the same, according to some embodiments.

FIG. 5 is a diagram showing an environment in which location-aware breakout point selection and routing can be implemented and example operations for providing the same, according to some embodiments. Some of the components shown in FIG. 5 are similar to the ones shown in FIGS. 1 and 3, and therefore descriptions of such components are not repeated in detail here for sake of brevity. As shown in the diagram, the environment includes a UE 110, base stations 140A and 140B, a central CSP premises 130A, an edge CSP premises 130B, an edge CSP premises 130C, and a central cloud infrastructure 120. The UE 110 may implement a client application that can access an application that is deployed in one or more edge clouds 520 over a mobile network.

The mobile network may be owned/operated by a CSP and may include the base stations 140, user plane functions or PDN gateways (UPF/PGWs) 180, and a core 170 (e.g., a 5G Core (5GC)) that includes a network exposure function (NEF) 175. The core 170 (including the NEF 175), UPF/PGW 180A, and the integration logic 590 may be deployed in central CSP premises 130A (e.g., a CSP's central Point of Presence (PoP)). As shown in the diagram, the central CSP premises 130A may further include a network status database 510. The network status database 510 may include various information regarding the configuration/topology and/or status of the mobile network. For example, the network status database 510 may include information regarding latency characteristics and/or network capacity utilization of UPF/PGWs 180 and edge locations and/or the availability of the edge locations (e.g., whether there are any network failures). Latency measurements may include latency estimates from different tracking areas/cells to UPF/PGWs 180 and latency estimates from the UPF/PGWs to interconnected edge nodes inside and outside the network infrastructure. Latency may be measured using operations system support (OSS), probes, and/or by other means. If real time latency measurements are not possible or practical to obtain, a static database can also be considered based on dedicated ("day 0") latency measurements. Network capacity may be measured using UPF/PGWs 180, other network functions, and/or by dedicated probes. In an embodiment, anonymized/scrambled cloud subscription ID specific traffic patterns may be collected to help optimize the edge location selection.

As shown in the diagram, edge CSP premises 130B (e.g., a CSP edge PoP) includes a UPF/PGW 180B and an edge cloud 520B. Edge cloud 520B may be configured with a subnet that implements a virtual machine (VM). The VM may implement an edge server application associated with the application. In this example, this VM is reachable using IP address B. Similarly, edge CSP premises 130C (e.g., another CSP edge PoP) includes a UPF/PGW 180C and an edge cloud 520C. Edge cloud 520C may be configured with a subnet that implements a VM. This VM may implement another edge server application associated with the application. In this example, the VM is reachable using IP address C. Edge CSP premises 130B and edge CSP premises 130C may be located in geographically disparate edge locations. Thus, in this way, multiple instances of the application may be deployed across multiple edge clouds 520 of the mobile network (as separate edge server applications) in different edge locations. At any moment in time, the UE 110 may be "closer" to one of the edge CSP premises, for example, in terms of geographical location and/or latency.

In an embodiment, an application developer may create a virtual private cloud (VPC) with edge subnets with a specific service level agreement (SLA). The application developer may then provision workloads (e.g., VMs or Kubernetes cluster worker nodes) into the edge subnets and allocate CSP network IP addresses (carrier IP addresses) for those workloads so that client applications can reach the edge server applications from the mobile network. Then, to simplify application development, the application developer may create a DNS record for the application in the DNS server 150 that includes a list of the edge server application (carrier) IP addresses. An alternative context is when the platform service 160 (e.g., a content distribution network (CDN), platform as a service (PaaS), function as a service (FaaS), etc.) provisions its runtimes across edge locations. In this case, the platform service may create its own DNS record (but the application developer may create an alias if their use cases requires it).

In an embodiment, when the DNS server 150 for the central cloud infrastructure 120 receives a query from the UE 110 to resolve a FQDN associated with the application, it determines whether the application is an edge cloud application (e.g., whether the application is deployed in one or more edge clouds 520 of the mobile network). If the DNS server 150 determines that the application is an edge cloud application, then then the DNS server 150 may call the API provided by the integration logic 590 to determine which edge server application the UE 110 should access. The DNS server 150 may provide the Internet Protocol (IP) address of the UE 110 and a list of edger server application IP addresses (e.g., which may be stored in DNS records) in this API call. In an embodiment, the DNS server 150 also provides in the API call an SLA and an indication of whether there is location stickiness or the goal is always the closest edge location. Alternatively or additionally, in an embodiment, the DNS server 150 provides in the API call information for realizing high availability such as a list of redundant 1P address pairs (e.g., per edge location) specifying the primary IP address for each pair. In response to receiving the API call, the integration logic 590 may call one or more APIs provided by the NEF 175 to determine which edge server application the UE should access. For example, the integration logic 590 may call a UE location API provided by the NEF 175 to obtain location information for the UE 110. The integration logic 590 may provide the IP address of the UE 110 in this API call. In response to receiving the API call, the NEF 175 may determine the location of the UE 110 (e.g., based on the IP address of the UE 110) and provide location information for the UE 110 to the integration logic 590. The integration logic 590 may then determine, based on accessing the network status database 510, the closest breakout point (e.g., closest UPF/PGW) to the UE 110 (e.g., in terms of geographic distance and/or latency) that the UE 110 can use to access an edge server application. The integration logic 590 may determine the closest breakout point based on the location information for the UE 110, the list of edge server application IP addresses, and the network status database 150. In an embodiment, the integration logic 590 takes "location stickiness" into consideration when making this determination. For example, the integration logic 590 may choose the breakout point previously used by the UE 110 even if there is now a closer breakout point if the previously used breakout point can still fulfill the SLA. This may help prevent "back and forth" edge location switching in some cases. In an embodiment, if a high availability feature is enabled, then the integration logic 590 uses the primary IP addresses from the IP address pairs list to determine the closest breakout point if the corresponding edge server application is available, otherwise, the integration logic 590 uses the secondary IP address. The integration logic 590 may then call a traffic routing API provided by the NEF 175 to configure the mobile network to route network traffic belonging to the UE 110 through the closest breakout point. The integration logic 590 may then send the IP address of the edge server application corresponding to the closest breakout point (the edge server application that is in the same edge location (e.g., same CSP premises) as the closest breakout point or otherwise proximate to the closest breakout point) to the DNS server 150. The DNS server 150 may then send the IP address of the edge server application to the UE 110 as a response to the UE's original query. The UE 110 may then use the IP address to access the edge server application over the mobile network with its network traffic being routed through the closest breakout point.

Example operations for providing location-aware breakout point selection and routing are now described to illustrate a particular embodiment. At operation 1, the UE 110 queries the DNS server 150 to resolve a FQDN associated with an application that is deployed in one or more edge clouds 520 (e.g., as edge server applications implemented by VMs across multiple edge clouds 520). This query is routed through the UPF/PGW 180A included in the central CSP premises 130A by default (the query "breaks out" on UPF/PGW 180A). At operation 2, the DNS server 150 calls an API provided by the integration logic 590 (e.g., providing the IP address of the UE 110 and a list of edge server application IP addresses in the API call) if it determines that the application is deployed in one or more edge clouds 520. At operation 3, the integration logic 590 calls the UE location API provided by the NEF 175 (e.g., providing the IP address of the UE 110 in the API call) to obtain location information for the UE 110 (e.g., the NEF 175 may determine the location of the UE 110 based on the IP address of the UE 110). At operation 4, the integration logic 590 determines, based on accessing the network status database 510, the closest breakout point to the UE 110 that can be used to access an edge server application. In this example, it is assumed that the closest breakout point to the UE 110 is UPF/PGW 180C. At operation 5, the integration logic 590 calls the traffic routing API provided by the NEF 175 to configure the mobile network to route network traffic belonging to the UE 110 through the breakout point that is determined to be closest to the UE 110. At operation 6, the integration logic 590 sends the IP address of the edge server application corresponding to the closest breakout point to the DNS server 150, which is IP address C in this example. At operation 7, the DNS server 150 returns the IP address of the edge server application (IP address C in this example) to the UE 110. At operation 8, the UE 110 accesses the edge server application using the IP address returned by the DNS server 150 (the UE 110 accesses the edge server application in edge CSP premises 130C in this example). This network traffic is routed through UPF/PGW 180C (the network traffic breaks out on UPF/PGW 180C). As a result, the UE 110 is able to access the edge server application that is located in the closest edge location (CSP premises 130C in this example).

Figure 6:
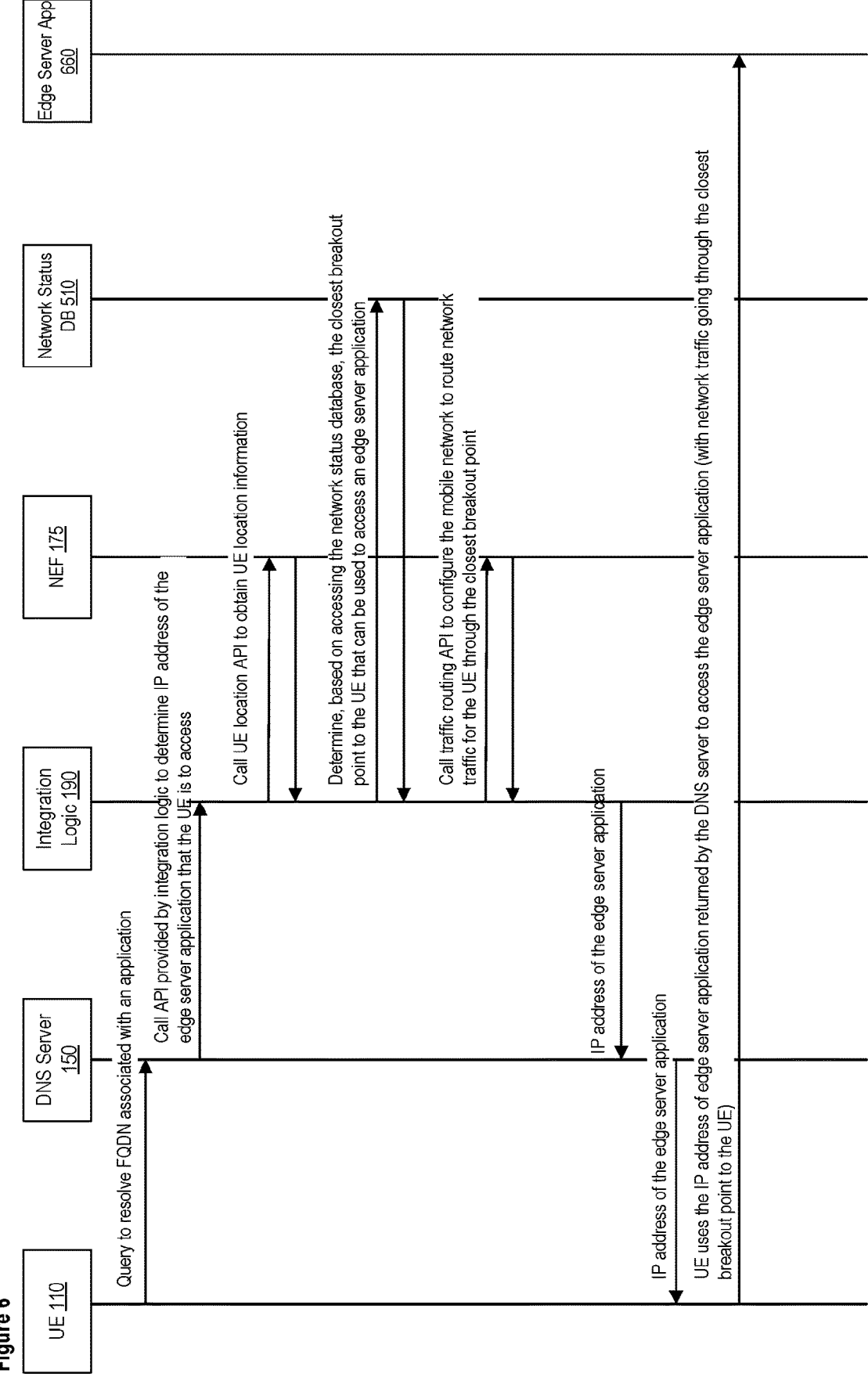
FIG. 6 is a diagram showing component interactions for providing location aware breakout point selection and routing, according to some embodiments.

FIG. 6 is a diagram showing component interactions for providing location-aware breakout point selection and routing, according to some embodiments. As shown in the diagram, the UE 110 sends a query to resolve a FQDN associated with an application deployed in one or more edge clouds to the DNS server 150. Responsive to receiving the query, the DNS server 150 calls the API provided by the integration logic 590 if it determines that the application is deployed in one or more edge clouds (the application is an edge cloud application). The integration logic 590 calls the UE location API provided by the NEF 175 to obtain location information for the UE 110. The integration logic 590 then determines, based on accessing the network status database 510, the closest breakout point to the UE 110 that can be used to access an edge server application. The integration logic 590 then calls the traffic routing API provided by the NEF 175 to configure the mobile network to route network traffic belonging to the UE 110 through the closest breakout point. The integration logic 590 then sends the IP address of the edge server application corresponding to the closest breakout point (e.g., the edge server application that is located in the same edge CSP premises 130 as the closest breakout point) to the DNS server 150. The DNS server 150 then sends the IP address of the edge server application to the UE 110. The UE 110 then uses the IP address returned by the DNS server 150 to access the edge server application, with its network traffic going through the closest breakout point.

Figure 7:
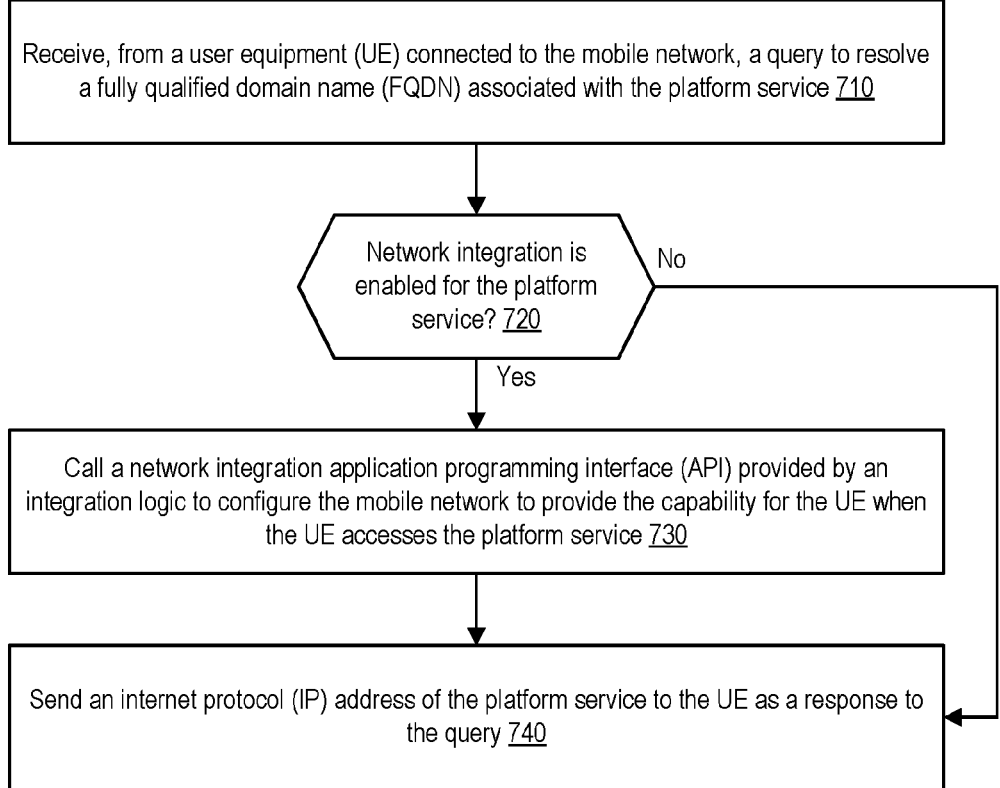
FIG. 7 is a flow diagram showing a method performed by a DNS server for a cloud infrastructure to integrate a capability provided by a mobile network with a platform service provided by the cloud infrastructure, according to some embodiments.

FIG. 7 is a flow diagram showing a method performed by a DNS server for a cloud infrastructure to integrate a capability provided by a mobile network with a platform service provided by the cloud infrastructure, according to some embodiments. The method may be implemented using hardware, software, or a combination thereof.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

At operation 710, the DNS server receives, from a UE connected to the mobile network, a query to resolve a FQDN associated with the platform service.

At operation 720, the DNS server determines whether network integration is enabled for the platform service. In an embodiment, the determination that network integration is enabled for the platform service is based on accessing a DNS record for the FQDN associated with the platform service. If network integration is not enabled, then the method moves to operation 740, where the DNS server sends an IP address of the platform service to the UE as a response to the query, and the method ends.

Otherwise, if network integration is enabled for the platform service, then at operation 730, the DNS server calls a network integration API provided by the integration logic to configure the mobile network to provide the capability for the UE when the UE accesses the platform service. In an embodiment, the call to the network integration API includes an IP address of the UE. In an embodiment, the capability is dynamic QoS and/or sponsored data.

At operation 740, the DNS server sends the IP address of the platform service to the UE as a response to the query.

In an embodiment, the cloud infrastructure provides a hyperscale cloud platform. In an embodiment, the platform service is a video processing service (e.g., Amazon Kinesis).

FIG. 8 is a flow diagram showing a method performed by an integration logic to integrate a capability provided by a mobile network with a platform service provided by a cloud infrastructure, according to some embodiments. The method may be implemented using hardware, software, or a combination thereof.

At operation 810, the integration logic receives, from a DNS server for the cloud infrastructure via a network integration API, a request to configure the mobile network to provide the capability for a UE. In an embodiment, the request includes an IP address of the UE.

At operation 820, responsive to receiving the request, the integration logic configures the mobile network to provide the capability for the UE when the UE accesses the platform service. This may involve operations 830-850. As shown in the diagram, in an embodiment, at operation 830, the integration logic calls a UE information API to obtain a subscription ID associated with the UE. In an embodiment (when the capability is dynamic QoS), at operation 840, the integration logic calls a dynamic QoS API to configure the mobile network to provide a particular level of QoS for the UE when the UE accesses the platform service. Alternatively or additionally, in an embodiment (when the capability is sponsored data), at operation 850, the integration logic calls a sponsored data API to configure the mobile network to provide sponsored data for the UE when the UE accesses the platform service.

FIG. 9 is a flow diagram showing a method performed by a DNS server for providing location aware breakout point selection and routing, according to some embodiments. The method may be implemented using hardware, software, or a combination thereof.

At operation 910, the DNS server receives, from a UE connected to the mobile network, a query to resolve a FQDN associated with an application, wherein the application is deployed in one or more mobile edge clouds of the mobile network.

At operation 920, the DNS server calls an API provided by an integration logic to determine an edge server application that the UE is to access.

At operation 930, the DNS server sends the IP address of the edge server application to the UE as a response to the query.

FIG. 10 is a flow diagram showing a method performed by an integration logic for providing location aware breakout point selection and routing, according to some embodiments. The method may be implemented using hardware, software, or a combination thereof.

At operation 1010, the integration logic receives, from a DNS server for the cloud infrastructure via a network integration API, a request to determine an edge server application that the UE is to access.

At operation 1020, the integration logic calls a UE location API to obtain location information for the UE.

At operation 1030, the integration logic determines, based on accessing a network status database, a breakout point that the UE is to use to access an edge server application. This may be, for example, the closest breakout point to the UE that the UE can use to access an edge server application, as described above.

At operation 1040, the integration logic calls a traffic routing API to configure the mobile network to route network traffic belonging to the UE through the determined breakout point.

At operation 1050, the integration logic sends, to the DNS server via the network integration API, an IP address of the edge server application as a response to the request.

Figure 11:
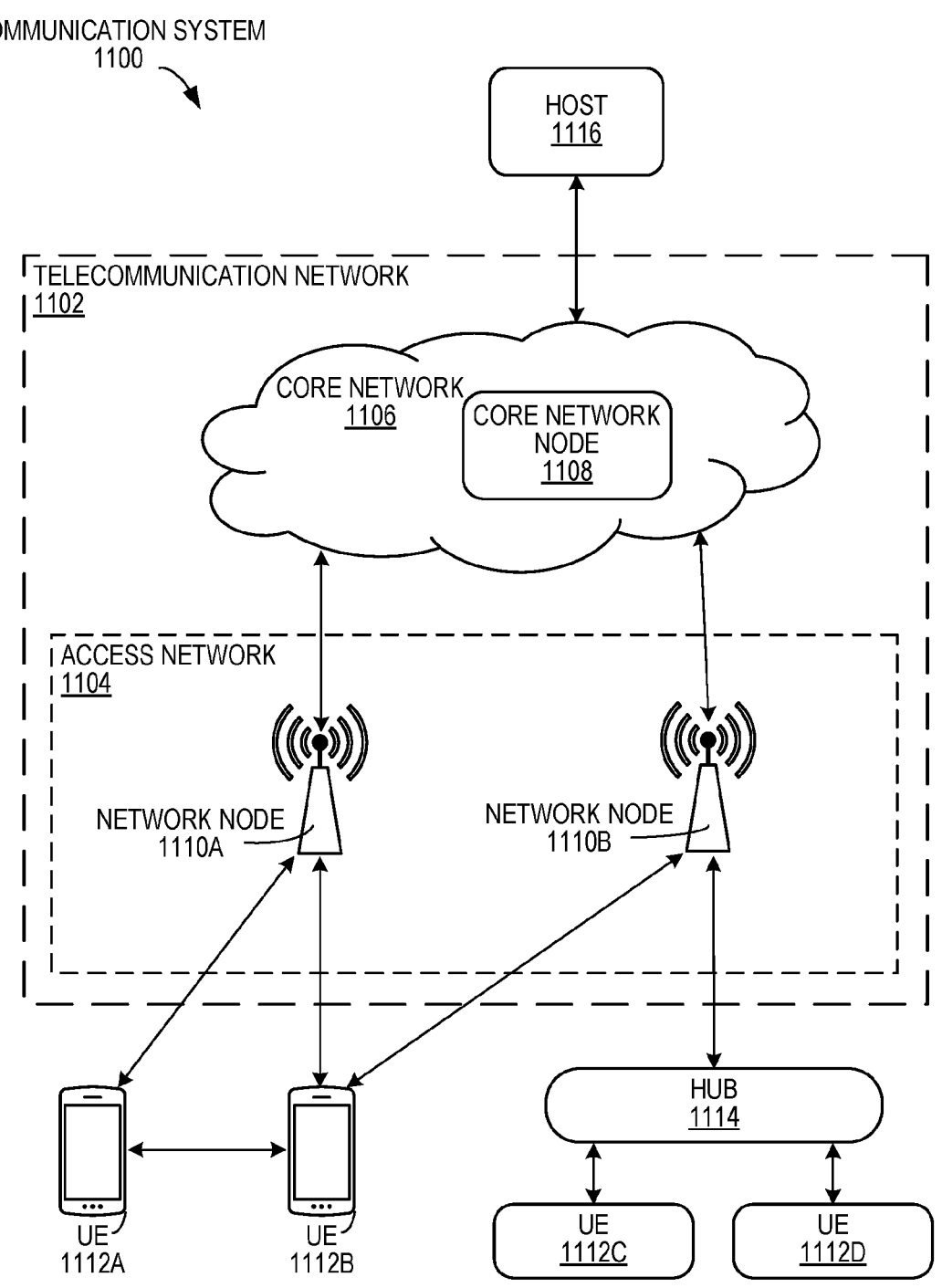
FIG. 11 shows an example of a communication system, according to some embodiments.

FIG. 11 shows an example of a communication system 1100 in accordance with some embodiments.

In the example, the communication system 1100 includes a telecommunication network 1102 that includes an access network 1104, such as a radio access network (RAN), and a core network 1106, which includes one or more core network nodes 1108. The access network 1104 includes one or more access network nodes, such as network nodes 1110_a_ and 1110_b_ (one or more of which may be generally referred to as network nodes 1110), or any other similar $3^{rd}$ Generation Partnership Project (3GPP) access node or non-3GPP access point. The network nodes 1110 facilitate direct or indirect connection of user equipment (UE), such as by connecting UEs 1112_a_, 1112_b_, 1112_c_, and 1112_d_ (one or more of which may be generally referred to as UEs 1112) to the core network 1106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1100 may include any number of wired or wireless networks, network nodes, UEs, and/or any other components or systems that may facilitate or participate in the communication of data and/or signals whether via wired or wireless connections. The communication system 1100 may include and/or interface with any type of communication, telecommunication, data, cellular, radio network, and/or other similar type of system.

The UEs 1112 may be any of a wide variety of communication devices, including wireless devices arranged, configured, and/or operable to communicate wirelessly with the network nodes 1110 and other communication devices. Similarly, the network nodes 1110 are arranged, capable, configured, and/or operable to communicate directly or indirectly with the UEs 1112 and/or with other network nodes or equipment in the telecommunication network 1102 to enable and/or provide network access, such as wireless network access, and/or to perform other functions, such as administration in the telecommunication network 1102.

In the depicted example, the core network 1106 connects the network nodes 1110 to one or more hosts, such as host 1116. These connections may be direct or indirect via one or more intermediary networks or devices. In other examples, network nodes may be directly coupled to hosts. The core network 1106 includes one more core network nodes (e.g., core network node 1108) that are structured with hardware and software components. Features of these components may be substantially similar to those described with respect to the UEs, network nodes, and/or hosts, such that the descriptions thereof are generally applicable to the corresponding components of the core network node 1108. Example core network nodes include functions of one or more of a Mobile Switching Center (MSC), Mobility Management Entity (MME), Home Subscriber Server (HSS), Access and Mobility Management Function (AMF), Session Management Function (SW), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1116 may be under the ownership or control of a service provider other than an operator or provider of the access network 1104 and/or the telecommunication network 1102, and may be operated by the service provider or on behalf of the service provider. The host 1116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1100 of FIG. 11 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1102 is a cellular network that implements 3GPP standardized features. Accordingly, the telecommunications network 1102 may support network slicing to provide different logical networks to different devices that are connected to the telecommunication network 1102. For example, the telecommunications network 1102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1112 are configured to transmit and/or receive information without direct human interaction. For instance, a UE may be designed to transmit information to the access network 1104 on a predetermined schedule, when triggered by an internal or external event, or in response to requests from the access network 1104. Additionally, a UE may be configured for operating in single or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 1114 communicates with the access network 1104 to facilitate indirect communication between one or more UEs (e.g., UE 1112*c* and/or 1112*d*) and network nodes (e.g., network node 1110*b*). In some examples, the hub 1114 may be a controller, router, content source and analytics, or any of the other communication devices described herein regarding UEs. For example, the hub 1114 may be a broadband router enabling access to the core network 1106 for the UEs. As another example, the hub 1114 may be a controller that sends commands or instructions to one or more actuators in the UEs. Commands or instructions may be received from the UEs, network nodes 1110, or by executable code, script, process, or other instructions in the hub 1114. As another example, the hub 1114 may be a data collector that acts as temporary storage for UE data and, in some embodiments, may perform analysis or other processing of the data. As another example, the hub 1114 may be a content source. For example, for a UE that is a VR headset, display, loudspeaker or other media delivery device, the hub 1114 may retrieve VR assets, video, audio, or other media or data related to sensory information via a network node, which the hub 1114 then provides to the UE either directly, after performing local processing, and/or after adding additional local content. In still another example, the hub 1114 acts as a proxy server or orchestrator for the UEs, in particular in if one or more of the UEs are low energy IoT devices.

The hub 1114 may have a constant/persistent or intermittent connection to the network node 1110*b*. The hub 1114 may also allow for a different communication scheme and/or schedule between the hub 1114 and UEs (e.g., UE 1112*c* and/or 1112*d*), and between the hub 1114 and the core network 1106. In other examples, the hub 1114 is connected to the core network 1106 and/or one or more UEs via a wired connection. Moreover, the hub 1114 may be configured to connect to an M2M service provider over the access network 1104 and/or to another UE over a direct connection. In some scenarios, UEs may establish a wireless connection with the network nodes 1110 while still connected via the hub 1114 via a wired or wireless connection. In some embodiments, the hub 1114 may be a dedicated hub—that is, a hub whose primary function is to route communications to/from the UEs from/to the network node 1110*b*. In other embodiments, the hub 1114 may be a non-dedicated hub—that is, a device which is capable of operating to route communications between the UEs and network node 1110*b*, but which is additionally capable of operating as a communication start and/or end point for certain data channels.

Figure 12:
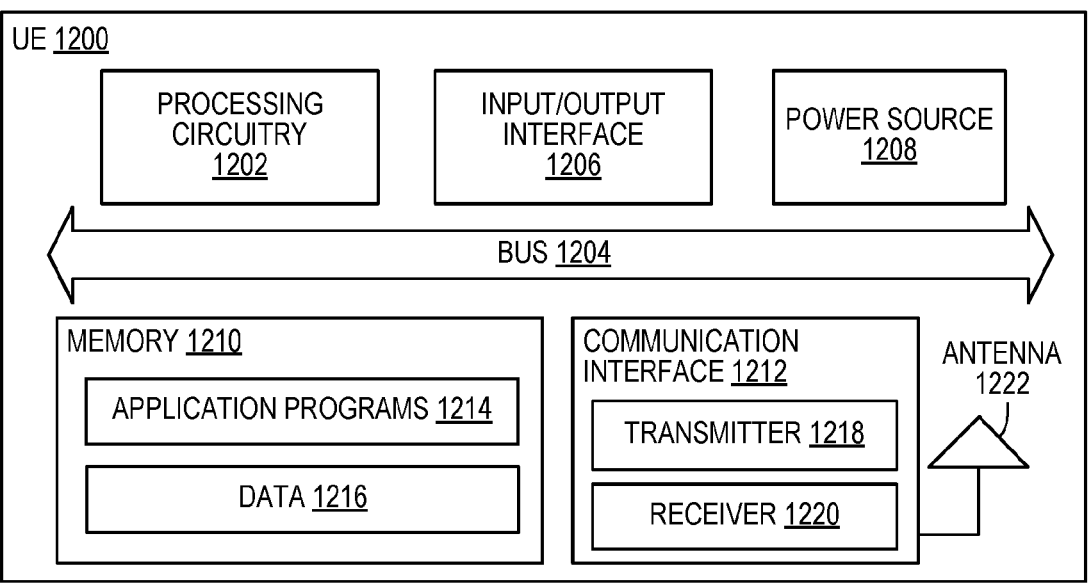
FIG. 12 shows a UE, according to some embodiments.

FIG. 12 shows a UE 1200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1200 includes processing circuitry 1202 that is operatively coupled via a bus 1204 to an input/output interface 1206, a power source 1208, a memory 1210, a communication interface 1212, and/or any other component, or any combination thereof. Certain UEs may utilize all or a subset of the components shown in FIG. 12. The level of integration between the components may vary from one UE to another UE. Further, certain UEs may contain multiple instances of a component, such as multiple processors, memories, transceivers, transmitters, receivers, etc.

The processing circuitry 1202 is configured to process instructions and data and may be configured to implement any sequential state machine operative to execute instructions stored as machine-readable computer programs in the memory 1210. The processing circuitry 1202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1202 may include multiple central processing units (CPUs).

In the example, the input/output interface 1206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1208 is structured as a battery or battery pack. Other types of power sources, such as an external power source (e.g., an electricity outlet), photovoltaic device, or power cell, may be used. The power source 1208 may further include power circuitry for delivering power from the power source 1208 itself, and/or an external power source, to the various parts of the UE 1200 via input circuitry or an interface such as an electrical power cable. Delivering power may be, for example, for charging of the power source 1208. Power circuitry may perform any formatting, converting, or other modification to the power from the power source 1208 to make the power suitable for the respective components of the UE 1200 to which power is supplied.

The memory 1210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1210 includes one or more application programs 1214, such as an operating system, web browser application, a widget, gadget engine, or other application, and corresponding data 1216. The memory 1210 may store, for use by the UE 1200, any of a variety of various operating systems or combinations of operating systems.

The memory 1210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1210 may allow the UE 1200 to access instructions, application programs and the like, stored on transitory or non-transitory memory media, to off-load data, or to upload data. An article of manufacture, such as one utilizing a communication system may be tangibly embodied as or in the memory 1210, which may be or comprise a device-readable storage medium.

The processing circuitry 1202 may be configured to communicate with an access network or other network using the communication interface 1212. The communication interface 1212 may comprise one or more communication subsystems and may include or be communicatively coupled to an antenna 1222. The communication interface 1212 may include one or more transceivers used to communicate, such as by communicating with one or more remote transceivers of another device capable of wireless communication (e.g., another UE or a network node in an access network). Each transceiver may include a transmitter 1218 and/or a receiver 1220 appropriate to provide network communications (e.g., optical, electrical, frequency allocations, and so forth). Moreover, the transmitter 1218 and receiver 1220 may be coupled to one or more antennas (e.g., antenna 1222) and may share circuit components, software or firmware, or alternatively be implemented separately.

In the illustrated embodiment, communication functions of the communication interface 1212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1200 shown in FIG. 12.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 13:
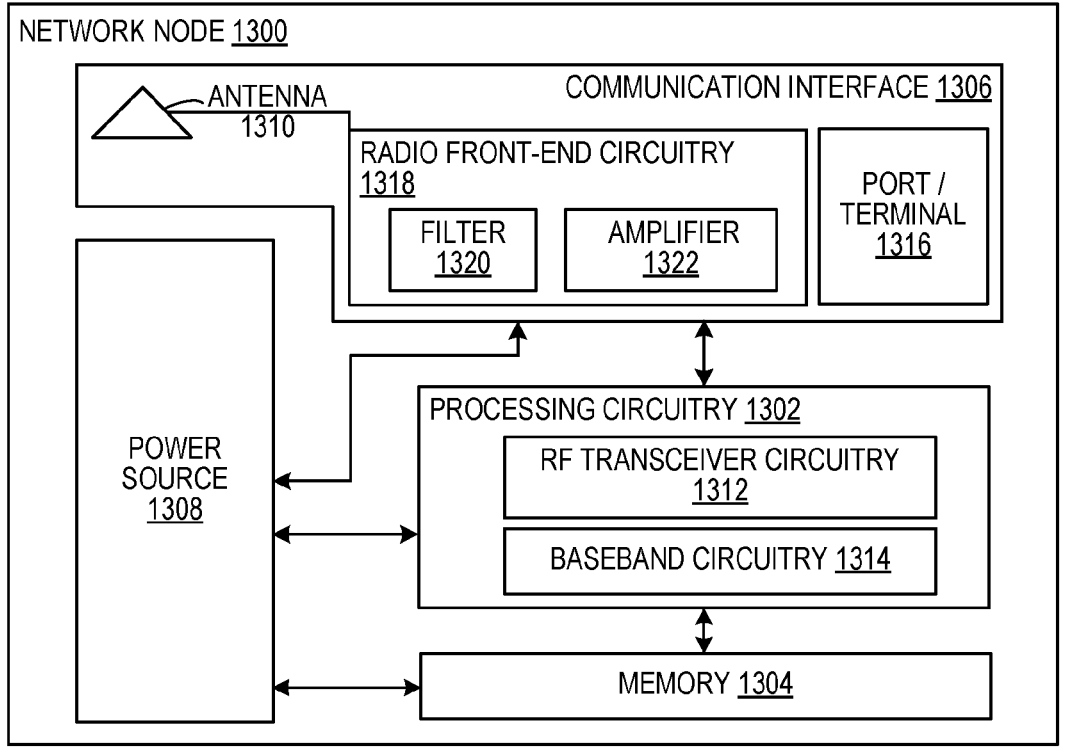
FIG. 13 shows a network node, according to some embodiments.

FIG. 13 shows a network node 1300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNB s) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1300 includes a processing circuitry 1302, a memory 1304, a communication interface 1306, and a power source 1308. The network node 1300 may be composed of multiple physically separate components (e.g., a NodeB component and a RNC component, or a BTS component and a BSC component, etc.), which may each have their own respective components. In certain scenarios in which the network node 1300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1300 may be configured to support multiple radio access technologies (RATs). In such embodiments, some components may be duplicated (e.g., separate memory 1304 for different RATs) and some components may be reused (e.g., a same antenna 1310 may be shared by different RATs). The network node 1300 may also include multiple sets of the various illustrated components for different wireless technologies integrated into network node 1300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1300.

The processing circuitry 1302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1300 components, such as the memory 1304, to provide network node 1300 functionality.

In some embodiments, the processing circuitry 1302 includes a system on a chip (SOC). In some embodiments, the processing circuitry 1302 includes one or more of radio frequency (RF) transceiver circuitry 1312 and baseband processing circuitry 1314. In some embodiments, the radio frequency (RF) transceiver circuitry 1312 and the baseband processing circuitry 1314 may be on separate chips (or sets of chips), boards, or units, such as radio units and digital units. In alternative embodiments, part or all of RF transceiver circuitry 1312 and baseband processing circuitry 1314 may be on the same chip or set of chips, boards, or units.

The memory 1304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1302. The memory 1304 may store any suitable instructions, data, or information, including a computer program, software, an application including one or more of logic, rules, code, tables, and/or other instructions capable of being executed by the processing circuitry 1302 and utilized by the network node 1300. The memory 1304 may be used to store any calculations made by the processing circuitry 1302 and/or any data received via the communication interface 1306. In some embodiments, the processing circuitry 1302 and memory 1304 is integrated.

The communication interface 1306 is used in wired or wireless communication of signaling and/or data between a network node, access network, and/or UE. As illustrated, the communication interface 1306 comprises port(s)/terminal(s) 1316 to send and receive data, for example to and from a network over a wired connection. The communication interface 1306 also includes radio front-end circuitry 1318 that may be coupled to, or in certain embodiments a part of, the antenna 1310. Radio front-end circuitry 1318 comprises filters 1320 and amplifiers 1322. The radio front-end circuitry 1318 may be connected to an antenna 1310 and processing circuitry 1302. The radio front-end circuitry may be configured to condition signals communicated between antenna 1310 and processing circuitry 1302. The radio front-end circuitry 1318 may receive digital data that is to be sent out to other network nodes or UEs via a wireless connection. The radio front-end circuitry 1318 may convert the digital data into a radio signal having the appropriate channel and bandwidth parameters using a combination of filters 1320 and/or amplifiers 1322. The radio signal may then be transmitted via the antenna 1310. Similarly, when receiving data, the antenna 1310 may collect radio signals which are then converted into digital data by the radio front-end circuitry 1318. The digital data may be passed to the processing circuitry 1302. In other embodiments, the communication interface may comprise different components and/or different combinations of components.

In certain alternative embodiments, the network node 1300 does not include separate radio front-end circuitry 1318, instead, the processing circuitry 1302 includes radio front-end circuitry and is connected to the antenna 1310. Similarly, in some embodiments, all or some of the RF transceiver circuitry 1312 is part of the communication interface 1306. In still other embodiments, the communication interface 1306 includes one or more ports or terminals 1316, the radio front-end circuitry 1318, and the RF transceiver circuitry 1312, as part of a radio unit (not shown), and the communication interface 1306 communicates with the baseband processing circuitry 1314, which is part of a digital unit (not shown).

The antenna 1310 may include one or more antennas, or antenna arrays, configured to send and/or receive wireless signals. The antenna 1310 may be coupled to the radio front-end circuitry 1318 and may be any type of antenna capable of transmitting and receiving data and/or signals wirelessly. In certain embodiments, the antenna 1310 is separate from the network node 1300 and connectable to the network node 1300 through an interface or port.

The antenna 1310, communication interface 1306, and/or the processing circuitry 1302 may be configured to perform any receiving operations and/or certain obtaining operations described herein as being performed by the network node. Any information, data and/or signals may be received from a UE, another network node and/or any other network equipment. Similarly, the antenna 1310, the communication interface 1306, and/or the processing circuitry 1302 may be configured to perform any transmitting operations described herein as being performed by the network node. Any information, data and/or signals may be transmitted to a UE, another network node and/or any other network equipment.

The power source 1308 provides power to the various components of network node 1300 in a form suitable for the respective components (e.g., at a voltage and current level needed for each respective component). The power source 1308 may further comprise, or be coupled to, power management circuitry to supply the components of the network node 1300 with power for performing the functionality described herein. For example, the network node 1300 may be connectable to an external power source (e.g., the power grid, an electricity outlet) via an input circuitry or interface such as an electrical cable, whereby the external power source supplies power to power circuitry of the power source 1308. As a further example, the power source 1308 may comprise a source of power in the form of a battery or battery pack which is connected to, or integrated in, power circuitry. The battery may provide backup power should the external power source fail.

Embodiments of the network node 1300 may include additional components beyond those shown in FIG. 13 for providing certain aspects of the network node's functionality, including any of the functionality described herein and/or any functionality necessary to support the subject matter described herein. For example, the network node 1300 may include user interface equipment to allow input of information into the network node 1300 and to allow output of information from the network node 1300. This may allow a user to perform diagnostic, maintenance, repair, and other administrative functions for the network node 1300.

Figure 14:
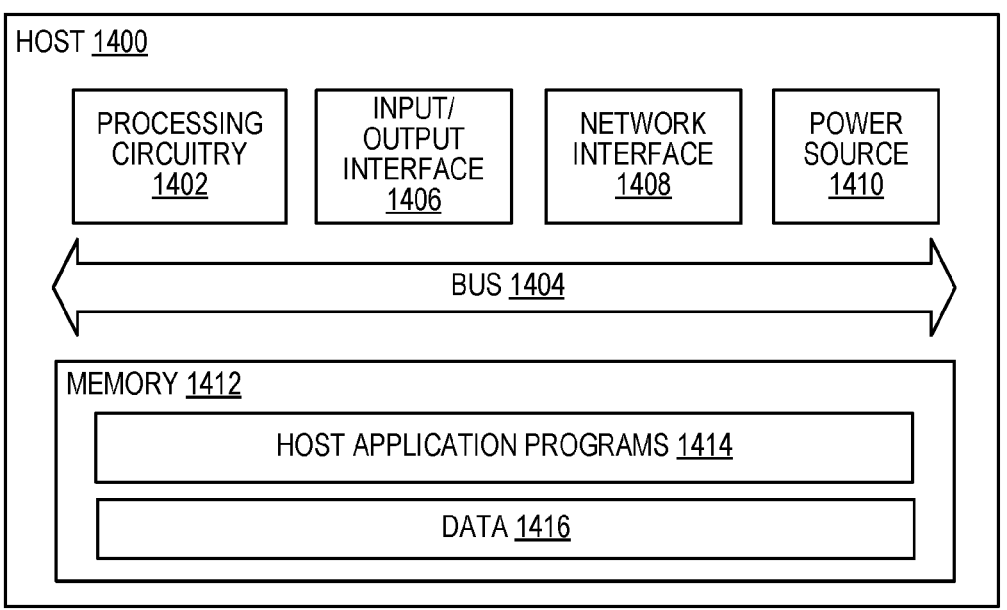
FIG. 14 is a block diagram of a host, according to some embodiments.

FIG. 14 is a block diagram of a host 1400, which may be an embodiment of the host 1116 of FIG. 11, in accordance with various aspects described herein. As used herein, the host 1400 may be or comprise various combinations hardware and/or software, including a standalone server, a blade server, a cloud-implemented server, a distributed server, a virtual machine, container, or processing resources in a server farm. The host 1400 may provide one or more services to one or more UEs.

The host 1400 includes processing circuitry 1402 that is operatively coupled via a bus 1404 to an input/output interface 1406, a network interface 1408, a power source 1410, and a memory 1412. Other components may be included in other embodiments. Features of these components may be substantially similar to those described with respect to the devices of previous figures, such as FIGS. 12 and 13, such that the descriptions thereof are generally applicable to the corresponding components of host 1400.

The memory 1412 may include one or more computer programs including one or more host application programs 1414 and data 1416, which may include user data, e.g., data generated by a UE for the host 1400 or data generated by the host 1400 for a UE. Embodiments of the host 1400 may utilize only a subset or all of the components shown. The host application programs 1414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1414 may also provide for user authentication and licensing checks and may periodically report health, routes, and content availability to a central node, such as a device in or on the edge of a core network. Accordingly, the host 1400 may select and/or indicate a different host for over-the-top services for a UE. The host application programs 1414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 15:
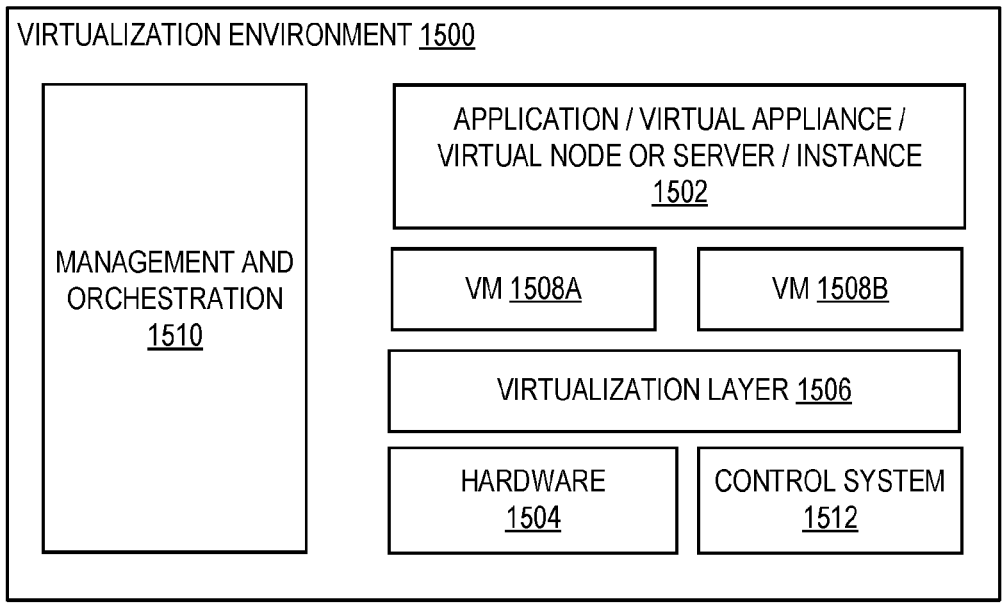
FIG. 15 is a block diagram illustrating a virtualization environment in which functions implemented by some embodiments may be virtualized.

FIG. 15 is a block diagram illustrating a virtualization environment 1500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1502 (which may alternatively be called software instances, virtual appliances, network functions, virtual nodes, virtual network functions, etc.) are run in the virtualization environment 1500 to implement some of the features, functions, and/or benefits of some of the embodiments disclosed herein.

Hardware 1504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1506 (also referred to as hypervisors or virtual machine monitors (VMMs)), provide VMs 1508a and 1508b (one or more of which may be generally referred to as VMs 1508), and/or perform any of the functions, features and/or benefits described in relation with some embodiments described herein. The virtualization layer 1506 may present a virtual operating platform that appears like networking hardware to the VMs 1508.

The VMs 1508 comprise virtual processing, virtual memory, virtual networking or interface and virtual storage, and may be run by a corresponding virtualization layer 1506. Different embodiments of the instance of a virtual appliance 1502 may be implemented on one or more of VMs 1508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1508 may be a software implementation of a physical machine that runs programs as if they were executing on a physical, non-virtualized machine. Each of the VMs 1508, and that part of hardware 1504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1508 on top of the hardware 1504 and corresponds to the application 1502.

Hardware 1504 may be implemented in a standalone network node with generic or specific components. Hardware 1504 may implement some functions via virtualization. Alternatively, hardware 1504 may be part of a larger cluster of hardware (e.g. such as in a data center or CPE) where many hardware nodes work together and are managed via management and orchestration 1510, which, among others, oversees lifecycle management of applications 1502. In some embodiments, hardware 1504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1512 which may alternatively be used for communication between hardware nodes and radio units.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a domain name system (DNS) server for a cloud infrastructure to integrate a capability provided by a mobile network with a platform service provided by the cloud infrastructure, the method comprising:

receiving, from a user equipment (UE) connected to the mobile network, a query to resolve a fully qualified domain name (FQDN) associated with the platform service;

responsive to a determination that network integration is enabled for the platform service, calling an application programming interface (API) provided by an integration logic, wherein the calling of the API causes the mobile network to provide the capability for the UE when the UE accesses the platform service; and sending an internet protocol (IP) address of the platform service to the UE as a response to the query.

2. The method of claim 1, wherein the call to the API provided by the integration logic includes an IP address of the UE.

3. The method of claim 1, wherein the determination that network integration is enabled for the platform service is based on accessing a DNS record for the FQDN associated with the platform service.

4. The method of claim 1, wherein the capability is dynamic quality of service (QoS).

5. The method of claim 1, wherein the capability is sponsored data.

6. The method of claim 1, wherein the cloud infrastructure provides a hyperscale cloud platform.

7. The method of claim 6, wherein the platform service is a video processing service.

8. A method performed by an integration logic to integrate a capability provided by a mobile network with a platform service provided by a cloud infrastructure, the method comprising:

receiving a request from a domain name system (DNS) server of the cloud infrastructure to configure the mobile network to provide the capability for a user equipment (UE); and responsive to receiving the request from the DNS server of the cloud infrastructure, calling a UE information API provided by the mobile network to obtain a subscription identifier (ID) associated with the UE and calling a network capability API provided by the mobile network using the subscription ID to provide the capability for the UE when the UE accesses the platform service.

9. The method of claim 8, wherein the request includes an internet protocol (IP) address of the UE.

10. The method of claim 8, wherein the capability is dynamic quality of service (QoS).

11. The method of claim 10, wherein the network capability API is a dynamic QoS API that configures the mobile network to provide a particular level of QoS for the UE when the UE accesses the platform service.

12. The method of claim 8, wherein the capability is sponsored data.

13. The method of claim 12, wherein the network capability API is a sponsored data API that configures the mobile network to provide sponsored data for the UE when the UE accesses the platform service.

14. A set of non-transitory machine-readable media having computer code stored therein, which when executed by a set of one or more processors of one or more network devices implementing a DNS server for a cloud infrastructure, causes the DNS server to perform operations for integrating a capability provided by a mobile network with a platform service provided by the cloud infrastructure, the operations comprising:

receiving, from a user equipment (UE) connected to the mobile network, a query to resolve a fully qualified domain name (FQDN) associated with the platform service;

responsive to a determination that network integration is enabled for the platform service, calling an application programming interface (API) provided by an integration logic, wherein the calling of the API causes the mobile network to provide the capability for the UE when the UE accesses the platform service; and sending an internet protocol (IP) address of the platform service to the UE as a response to the query.

15. The set of non-transitory machine-readable media of claim 14, wherein the call to the API provided by the integration logic includes an IP address of the UE.

16. The set of non-transitory machine-readable media of claim 14, wherein the capability is dynamic quality of service (QoS).

17. The set of non-transitory machine-readable media of claim 14, wherein the capability is sponsored data.

18. A set of non-transitory machine-readable media having computer code stored therein, which when executed by a set of one or more processors of one or more network devices implementing an integration logic, causes the integration logic to perform operations for integrating a capability provided by a mobile network with a platform service provided by a cloud infrastructure, the operations comprising:

receiving a request from a domain name system (DNS) server of the cloud infrastructure to configure the mobile network to provide the capability for a user equipment (UE); and responsive to receiving the request from the DNS server of the cloud infrastructure, calling a UE information API provided by the mobile network to obtain a subscription identifier (ID) associated with the UE and calling a network capability API provided by the mobile network using the subscription ID to provide the capability for the UE when the UE accesses the platform service.

19. The set of non-transitory machine-readable media of claim 18, wherein the capability is dynamic quality of service (QoS).

20. The set of non-transitory machine-readable media of claim 19, wherein the network capability API is a dynamic QoS API that configures the mobile network to provide a particular level of QoS for the UE when the UE accesses the platform service.

* * * * *